US005293484A

United States Patent [19]

Dabbs, III et al.

[11] Patent Number: 5,293,484

[45] Date of Patent: Mar. 8, 1994

[54] METHOD AND APPARATUS FOR CONTROLLING ELECTRONICS SIGNS USING RADIOPAGING SIGNALS

[75] Inventors: James M. Dabbs, III, Duluth; S. Tom Smith, Ellenwood; Robert S. Bundy, Snellville, all of Ga.

[73] Assignee: SignTel, Inc., Ellenwood, Ga.

[21] Appl. No.: 917,206

[22] Filed: Jul. 22, 1992

[51] Int. Cl.[5] ..... G06F 3/14

[52] U.S. Cl. ..... 395/164; 395/162; 340/825.26; 340/825.44

[58] Field of Search ..... 395/162, 164; 340/825.44, 825.26; 455/343; 379/59

[56] References Cited

U.S. PATENT DOCUMENTS

| | | | |
|---|---|---|---|
| 4,713,808 | 12/1987 | Gaskill et al. . | |
| 4,768,031 | 8/1988 | Mori et al. | 340/825.44 |
| 4,783,654 | 11/1988 | Ichikawa . | |
| 4,956,641 | 9/1990 | Matai et al. . | |
| 4,967,194 | 10/1990 | Haruki . | |
| 5,045,850 | 9/1991 | Andros et al. | 340/825.44 |
| 5,061,921 | 10/1991 | Lesko et al. . | |
| 5,151,694 | 9/1992 | Yamasaki | 340/825.44 |

OTHER PUBLICATIONS

Radiopaging Code No. 1, Compiled by Radiopaging Code Standards Group.

*Primary Examiner*—Robert L. Richardson

*Attorney, Agent, or Firm*—Roylance, Abrams, Berdo & Goodman

[57] ABSTRACT

An advanced telecommunication system is provided for central control of electronic signs. A display development kit is provided to create binary display programs which create visual activity on one or more electronic signs. These display programs are stored on the disk drive of a system control computer which periodically runs a system control program to upload display programs to the electronic signs using radiopaging signals. The system control program employs a telephone modem to connect through a public switched telephone network (PSTN) to a paging terminal. In accordance with the system control program, the system control computer divides each display program into multiple packets which are transmitted to the paging terminal as alphanumeric radiopages. The paging terminal encodes the packets into radiopaging format, frequency shift key modulates the data, and transmits the pages on a radio frequency channel. Electronic signs decode the radiopages into data packets. A receiver subsystem in the electronic sign reconstructs the original display programs using the data packets. Data provided in a display program can span across more than one page. The system control program creates packets containing display program data such that blocks of display program data that are greater than one page are transmitted transparently to a paging terminal from the central computer, and from the paging terminal to a paging receiver without requiring hardware or software modification of existing paging terminals and paging central offices.

24 Claims, 15 Drawing Sheets

METHOD AND APPARATUS FOR CONTROLLING ELECTRONICS SIGNS USING RADIOPAGING SIGNALS

BACKGROUND OF THE INVENTION:

1. Field of the Invention:

The invention relates generally to a telecommunication system, and more particularly to a computer controlled system for controlling electronic signs using radiopaging techniques.

2. Description of the Related Art:

A method of cost-efficient, centralized control of electronic displays that does not require a physical communication link between the displays and a central computer is advantageous because the method allows the placement of electronic information displays in areas where such a communication link is prohibitively costly and sometimes impossible. Several methods of centralized control of electronic signs exist. One method uses a standard telephone line to connect each electronic display to the Public Switched Telephone Network (PSTN). Another telephone line connects a central control computer to the PSTN. The control computer and the electronic signs each use a telephone MODEM to send and receive data. In this configuration, the central computer can place a telephone call to each sign or a group of signs to upload programming information over the PSTN using an end-to-end protocol such as XMODEM or X.25. This method works well for a small number of signs. Large organizations of signs, however, require many dedicated telephone lines. The use of telephone lines with a large organization of signs is disadvantageous because communication cost increases linearly with the number of displays. Additionally, the telephone lines are inconvenient and sometimes impossible to install in some locations. Further, the use of telephone lines with electronic signs limits the mobility of the displays. Placing displays interconnected in such a fashion onto public transportation vehicles, for example, is impossible.

The mobility limitation can be eliminated by substituting a cellular or mobile telephone link for the conventional telephone line, allowing connection between a central controlling computer and electronic displays without a physical connection to each sign. This approach is nonetheless disadvantageous because a call over the mobile telephone link must still be completed for each sign receiving display data. Thus, line cost continues to increase linearly with the number of signs in the network.

A number of approaches for providing electronic signs with display data which address both sign mobility and communication cost exist. A first method places an FM receiver into each sign on the network and modulates the data intended for each sign onto the subcarrier of a commercial broadcasting station. This method offers fixed costs and mobility, but presents a number of disadvantages. First, the subcarrier signal carries only a fraction of the broadcast power of the commercial stations. Second, modulation of the data in this way reduces the power of the signal and degrades the overall signal quality. Third, FM broadcast paging companies generally do not perform simultaneous broadcasts of radiopage signals to a number of page receivers.

A second method uses existing radiopaging technology by placing an alphanumeric pager (i.e., pager receiver) within each electronic sign. Messages intended for the signs are then transmitted as alphanumeric radiopages that are received by pagers within the signs. The alphanumeric pager outputs the data onto its printer port, which is connected to a compatible port within the sign itself. The data is then received and stored in the sign's memory. This approach has the advantage that it does not interfere with the primary operation of the paging company, but it imposes the disadvantage of limiting messages to the length of an alphanumeric page and restricting characters outside the ASCII 7-bit printable character set. These restrictions preclude the transmission of large bit mapped graphic images.

Other methods for providing display data to electronic signs involve creating a format which either allows longer pages or allows messages to be spread over multiple pages. A method that allows messages of arbitrarily long duration is undesirable because long messages cause delay in transmitting other pages and thereby adversely effect the overall response time of the paging system. Spreading a long message over multiple pages is difficult because paging systems use time slot address selection to allow pagers to efficiently use their batteries. Paging systems often re-sort pages from their original chronological order before transmission to minimize transmission of idle code words. Thus, recovery of re-sorted data is rendered more difficult at the paging receiver. Some paging formats exist for creating long pages from several short pages; however, these formats do not allow for the reordering of the pages. Further, these paging formats would require paging companies to replace existing hardware and undergo extensive software upgrades.

SUMMARY OF THE INVENTION:

The present invention relates to a radiopaging system for providing display data to electronic signs which overcomes several shortcomings and realizes several advantages over existing radiopaging systems. In accordance with the present invention, a reliable method is provided for controlling electronic signs from a central location which uses an unconstrained data message length, a wireless connection to each sign, and maintains low communication cost regardless of the number of signs in the system. Further, the electronic sign control system of the present invention employs existing radiopaging equipment without requiring hardware or software modification, and current radiopaging communications standards to broadcast control messages. The broadcast control messages are formatted as alphanumeric radiopages containing a binary data message which can be more than one page in length.

In the present invention, a system control computer operates in accordance with a system control program to access a system database containing a number of display programs which, when executed by a display controller within an electronics sign, generate a sequence of animated images to appear on the display of the electronic sign. An system administrator issues commands instructing the computer to transmit specified display programs to selected signs. Each group of signs is tuned to a particular receiver frequency and uses a particular receiver identification code (hereinafter "RIC"). These groups are further subdivided with "group bits" embedded within the actual radio page. Once these requests for transmission are entered by the user, the computer automatically begins downloading the specified display programs to the signs at a predetermined time, which usually coincides with the off-peak hours of the paging system used.

In accordance with the system control program, the system control computer divides a display program intended for transmission to an electronic sign into a number of packets, each of which contains multiple subpackets. A communication computer is provided at the electronic sign to reconstruct the display program using the subpackets. After the computer completes this division process, the system control computer commands a MODEM to dial through the Public Switched Telephone Network to complete a call to a paging terminal, which in turn is coupled to one or more radio frequency transmitters tuned to the operating frequencies of pagers in the electronic signs.

Subscriber database records in the subscriber database located in the memory of the paging terminal comprise specific parameters which are used to access the radiopaging receivers within each electronic sign. The system control computer sends the packets derived from the display program to the paging terminal in the form of radiopages containing a pager identification number (hereinafter "PIN") and a data block using the ixo/TAP protocol. The paging terminal accesses the subscriber database to convert the PIN of each ixo/TAP radiopage into an RIC that matches the RIC corresponding to the radiopaging receiver installed in the targeted electronic signs. The paging terminal encodes the data in each ixo/TAP compatible page into a format compatible with CCIR RPC.1 paging format. Upon a user's request, these pages may be transmitted multiple times for better reception reliability.

The paging terminal broadcasts pages as modulated data through the connected radio frequency transmitters. This modulated data is received by the radiopaging receivers in the electronic signs, which decodes the radiopages to extract the original packets. A receiver subsystem within each electronic sign stores each packet in its RAM, sorts the packets into their chronological order and retains damaged packets until duplicate packets are received. The receiver subsystem can replace damaged subpackets with higher quality subpackets using POCSAG error correction syndrome bits. The receiver subsystem performs codeword comparisons to isolate the best quality codewords from duplicate packets. Once the receiver subsystem receives all the radiopages and recovers all of the data associated with a display program, it transmits the display program to a display subsystem, which executes the display program to produce the desired effect on the display of the electronic sign.

A display program is transmitted as one or more pages or packets. The system control computer places a byte containing a message identification number, which uniquely identifies the display program from other programs that are to be transmitted, in each of the subpackets constituting the pages. The pages associated with a display program are distinguished by a sequentially assigned page sequence number that is placed in a byte of each subpacket constituting that particular page. The computer creates pages within the constraints of the paging specifications of the paging terminal such as the maximum number of bytes permitted per page. Each page is provided with a header subpacket and a trailer subpacket. Subpackets formulated for transmission between the header and trailer subpackets are derived from the display program. Display program characters which are printable ASCII characters corresponding to binary values between 32 and 126 are transmitted as such. Display program characters having binary equivalents outside this range of values are converted to two-character hexadecimal values. Thus, the invention allows arbitrary 8 bit data words to be efficiently mapped into the 7 bit ASCII words commonly used in alphanumeric paging. Pages do not have to be transmitted by the paging terminal in their original order.

The paging receiver subsystem in the electronic sign decodes received data in accordance with the message identification number, the page sequence number and the total number of subpackets per page using a packet sorting queue. The packets are placed in chronological order using the packet queue. Data is extracted from the packets and reformulated as the original display program using the message buffer.

BRIEF DESCRIPTION OF THE DRAWINGS

These and other features and advantages of the invention will be more readily understood from the following detailed description when read together with the accompanying drawings, in which.

DETAILED DESCRIPTION OF PREFERRED EMBODIMENTS

Figure 1:
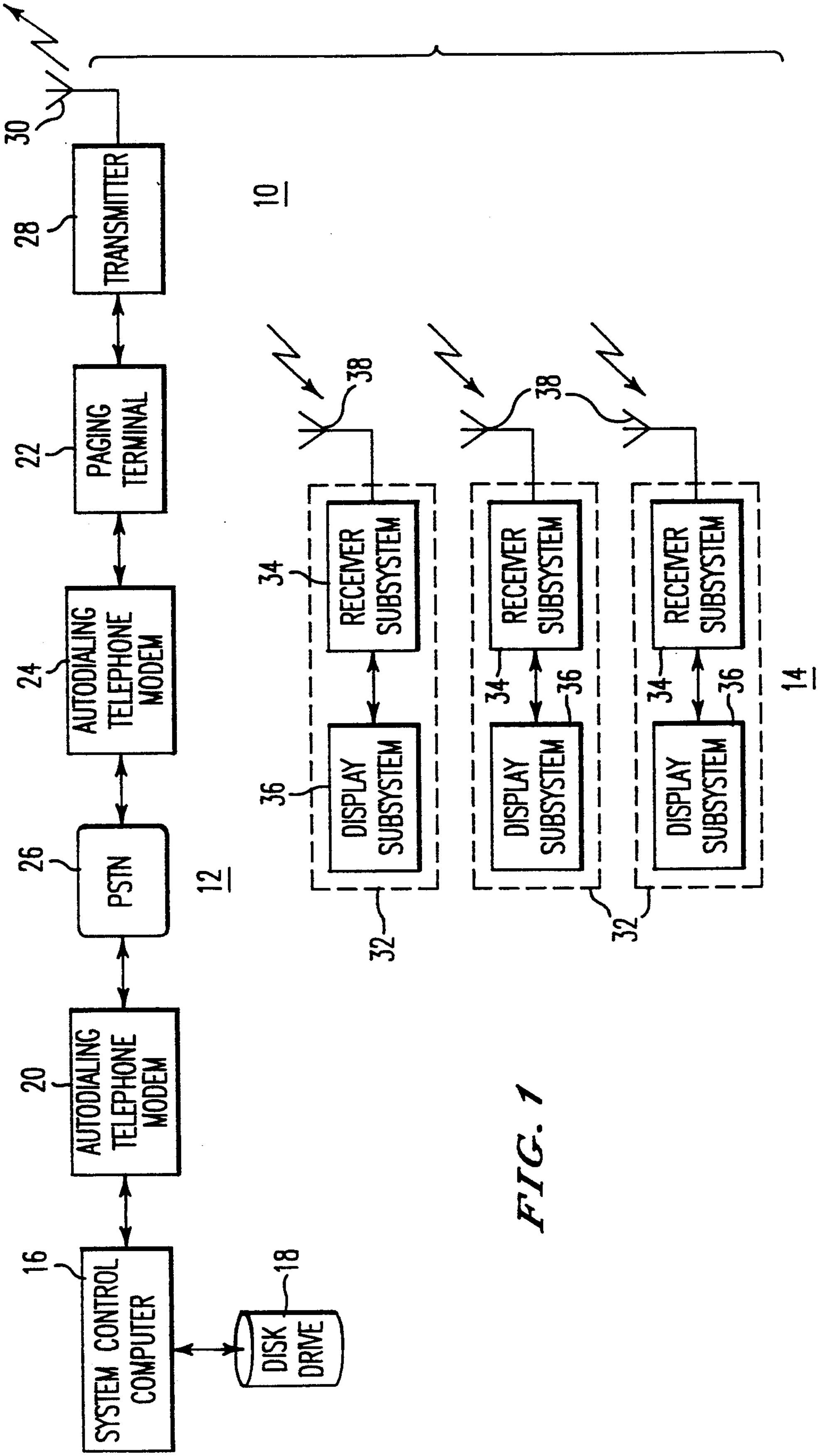
FIG. 1 is a schematic diagram of a radiopaging system in accordance with the present invention.

With reference to FIG. 1, a system 10 for controlling remote electronic signs using radiopaging techniques is depicted which comprises head end equipment 12 and receive end equipment 14 in accordance with the present invention. The head end equipment 12 comprises a system control computer 16 which is coupled to disk drive 18 and a telephone modem 20. The system control computer 16 accesses a paging terminal 22, which is also coupled to a modem 24, through a public switched telephone network (PSTN) 26. The paging terminal transmits pages to a number of electronic signs using a transmitter 28 and antenna 30. The receive end equipment 14 comprises one or more electronic signs 32, each of which comprises a receiver subsystem 34, a display subsystem 36 and an antenna 38.

Figure 2:
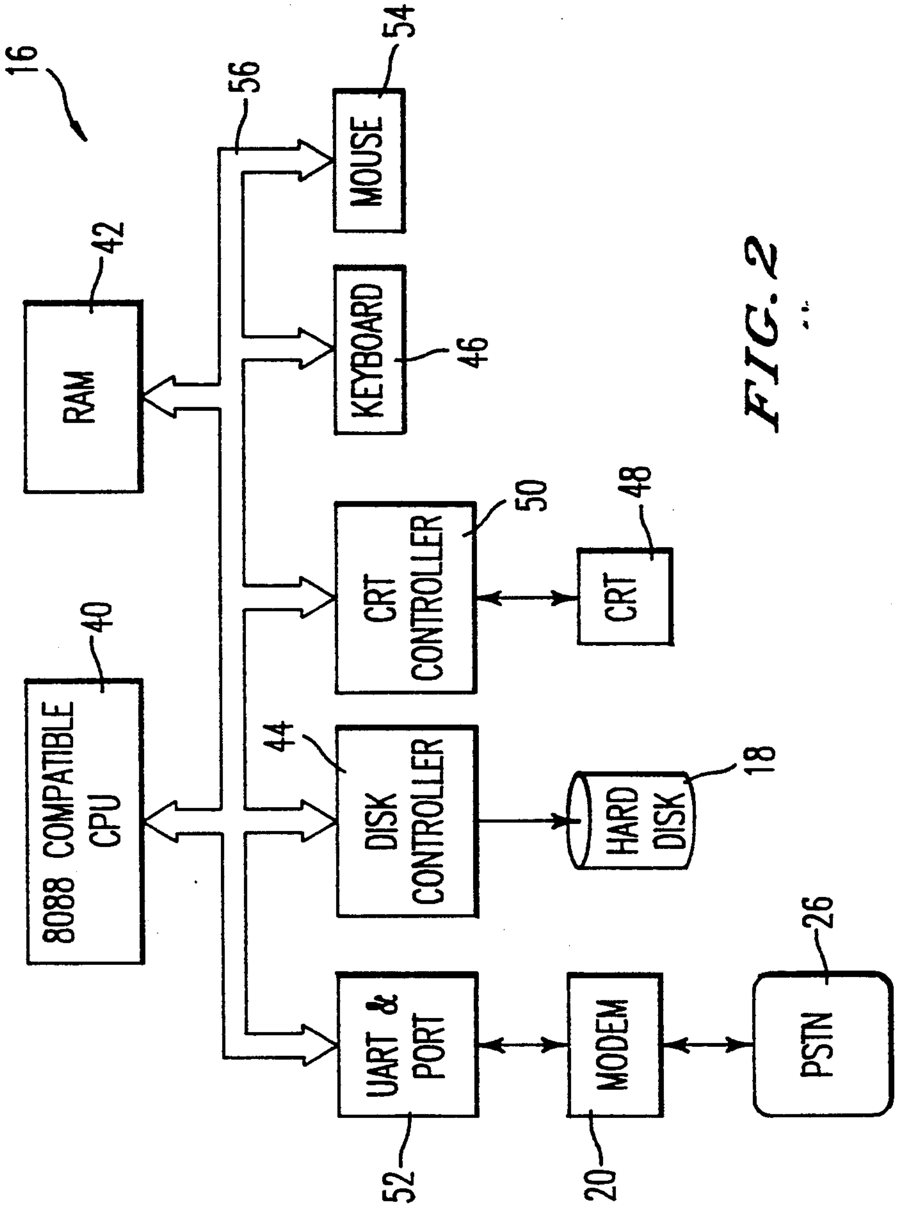
FIG. 2 is a block diagram of a system control computer constructed in accordance with the present invention.

As shown in FIG. 2, the system control computer 16 is preferably an personal computer manufactured by International Business Machines, or other compatible computer, and comprises an Intel Corporation 8088 microprocessor 40, a 640 kilobyte random access memory (RAM) 42, a disk controller 44, a keyboard 46, a text display CRT 48 and CRT controller 50, a serial port 52, i.e., a universal asynchronous transmitter (UART) capable of asynchronous serial communication at 1200 baud, and a mouse 54, which are interconnected by a conventional data and address bus 56. The system control computer 16 preferably executes a Microsoft Disk Operating System (MSDOS) or other compatible disk operating system, and a system control program.

Figure 3:
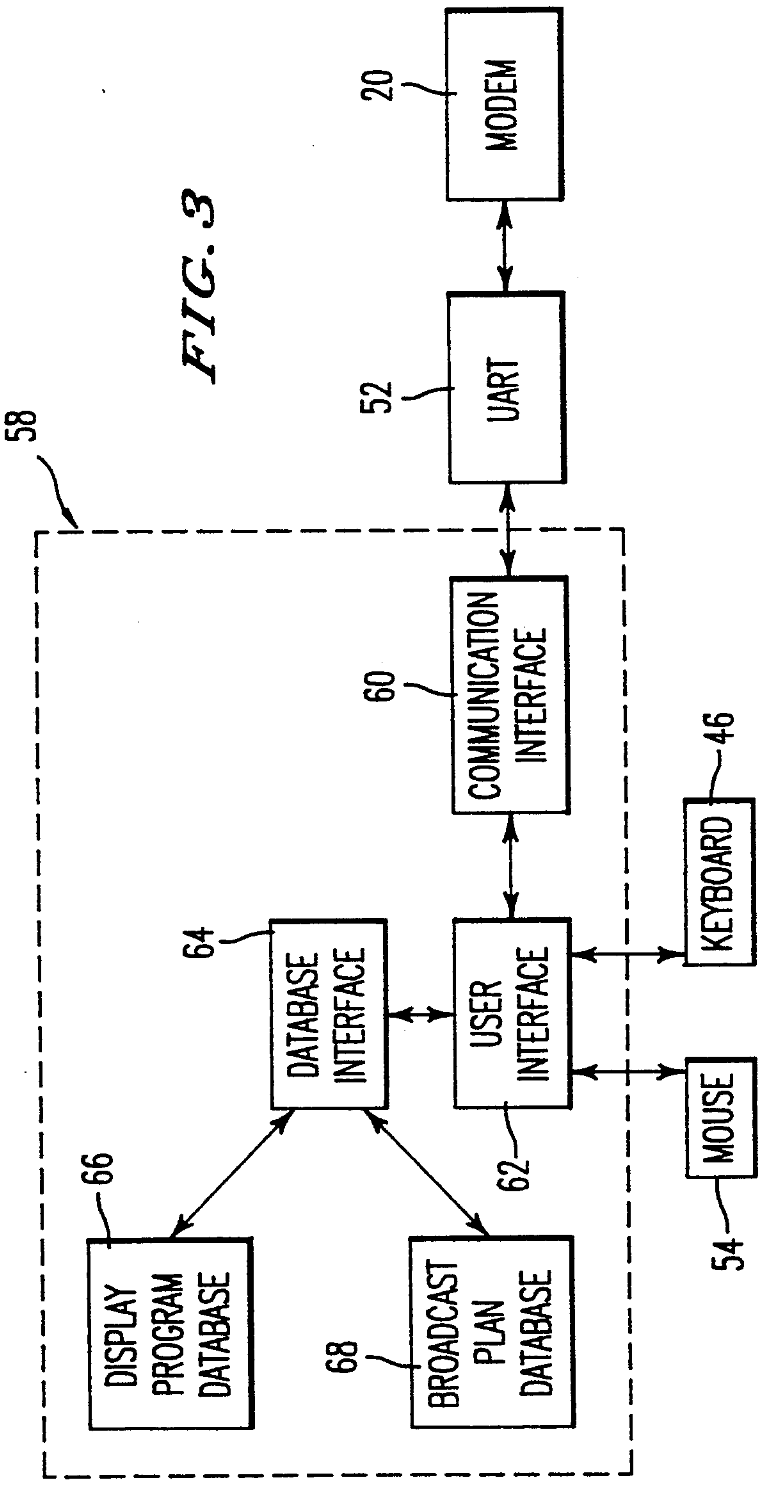
FIG. 3 is a schematic diagram of the system control computer software.

The system control program is operated by a system administrator to control a plurality of electronic signs. With reference to FIG. 3, the system control program 58 comprises a communication interface module 60 for providing data messages, i.e., binary coded representations of display programs to the UART 52 and modem 20, a user interface module 62 for processing user input signals from the keyboard 46 and the mouse 54, and a database interface module 64 for writing data to and receiving data from a display program database 66 and a broadcast plan database 68.

The display program database contains a number of display programs created using a software development tool hereinafter referred to as a display development program and described in further detail below. The administrator enters display programs into the display program database using the user interface 62. The administrator types in a command to add a display program and also provides a DOS pathname to the actual display program file, which was preferably created using the display development program. The database interface 64 enters the display program into a record of the display program database 66, gives the record a unique keyname that matches the file name, and assigns the display program a unique tag to identify it for use with remotely controlled signs. The administrator can also delete records from the display program database by entering a delete command followed by the record keyname.

Once a display program is entered into the display program database 68, the administrator can assign it to one or more records in the broadcast plan database 68. The broadcast plan database contains a single record for each logical group of signs that describes how the system control program transmits data to signs in that logical group. Numbers for identifying groups of signs sharing an identical RIC are described below in connection with Table 1. Each record contains a telephone number of a paging terminal modem, the line discipline parameters required to connect to the paging terminal, the maximum page length accepted by the paging terminal, the optimal transmission time of the paging terminal, a pager identification number relating to the receiver identification code within the sign group, the group mask bits which may be set in the sign group, and any other information required for transmission.

While executing the system control program 58 detailed in FIG. 3, the computer 16 continuously scans each record within the broadcast plan database 68. At a designated transmission time specified within a broadcast plan record, the computer examines the record and determines whether display programs assigned to a particular broadcast plan record have not yet been transmitted. If such display programs exist, the computer autonomously completes a call to the paging terminal 22 using the MODEM 24 telephone number specified within the record, and uploads these display programs in accordance with the process described below in connection with FIGS. 4, 5 and 6. Likewise, if the computer 16 determines that display programs are identified for deletion, the computer uploads a delete command data structure to the paging terminal. The delete command data structure comprises a list of tag numbers corresponding to the display programs intended for removal from the RAM of an electronic sign, which is reached using data from a broadcast plan record.

To transmit a display program, the computer 16 is programmed to complete a call to a paging terminal operating in the area of the sign selected by the customer. The computer transmits the display programs to the paging terminal using the Motorola IXO or Telelocator Alphanumeric Protocol, which is hereinafter referred to as the ixo/TAP protocol. This protocol is typically used for the input of numeric, alphanumeric or tone-only messages to a paging terminal from a computer via an autodialer or modem, and allows for some variances between paging companies. For example, paging companies can opt to use passwords and to transmit optional message sequences to a computer during the handshaking process. Data relating to these variances are stored along with other data, i.e., line discipline parameters, in the broadcast plan database 66.

A programmer creates a disk image of a display program using an integrated software development tool designated as a display development kit. The display development kit allows a programmer to either enter a program directly in a symbolic language (i.e., Sign Language developed by Signtel Inc. of Ellenwood, Ga.) or to describe a program as a list of high level actions that are automatically converted into Sign Language, for example. In either case, the Sign Language or other program is compiled into binary form that is compatible with the processor within the electronic sign. Display program files created using the Sign Language software are generally identified by a suffix ".DP" appended to the end of the filename. These display programs can be provided to the system administrator on a diskette or through a PSTN using a MODEM to access the display program database.

The display development program comprises three modules, including an image editor, a programmer's interface, and an action list editor, which are be accessed via a menu on a personal computer. A programmer uses a mouse to select menu items and to use these three functions. The image editor allows the user to create and edit bit-mapped image files for use with Sign language programs, for example. These bit-mapped image files are generally identified by a file name extension ".IMA" appended to the end of the file name. The image editor also allows import of PCX files generated by PC Paintbrush, a software developed by Z-Soft, Inc., which supports a more complete graphics editing environment including optical scanner support.

The programmer's interface offers a text editor based environment which allows a programmer to write display programs directly using, for example, the Sign Language software. The text editor, which is similar to other common text editors such as "vi" and "emacs," allows insertion, deletion, and global search and replace. The user can compile directly from the text editor and simulate a Sign Language program on the PC screen in real time. The action list editor provides a higher level interface, replacing the text editor with a menu driven list of actions such as "MOVING TEXT" and "STATIONARY IMAGE." Using a quasi-expert system, the programmer identifies the types of sign actions desired and then follows the suggestions set forth by the software to generate specific parameters required such as speed, special effects, and coordinate location of objects on the screen. At the user's command, the action list can be converted into Sign Language and then compiled.

The system control computer 16 is operated in accordance with the system control program which preferably controls the computer 16 from the operating system shell. As an alternative embodiment, the system control program can operate in conjunction with a multi-tasking operating system such as the American Telephone and Telegraph UNIX operating system, which allows a version of the system control program to run simultaneously with other programs on the same computer 16.

In accordance with the present invention, a packet format is employed to allow a display program, which is longer than the standard page size of the destination paging terminal, to be transmitted as a series of alphanumeric pages. Each display program is considered to be a single message that is divided into a number of subpackets. These subpackets are derived from the display program data in such a way that they contain only characters compatible with the ixo/TAP protocol employed by the paging terminal, as described below in connection with FIG. 6. The subpackets are then concatenated into alphanumeric pages by placing as many subpackets as possible into each page. A header subpacket is included as the first subpacket in the first page of possibly several pages corresponding to a given message. The header subpacket contains a cyclical redundancy check word, i.e., CRC16, and the length of the original display program. A trailer subpacket is included as the last subpacket in the last page of the message. In order to allow the receiving processor to reconstruct the data in the correct order, each page is given a sequentially increasing serial number, and each page associated with a particular message is given a sequentially increasing message identification number. Both of these numbers are placed at fixed locations within the page data. In accordance with another aspect of the invention, the data pages can be encrypted using an encryption code to guarantee security while the data is being broadcast.

The invention is advantageous over prior transmission systems for display programs because it can accommodate the transmission of graphic messages that are generally greater than one page in length using current radiopaging communications standards. Thus, no modification of existing radiopaging equipment is necessary. For example, multiple-page messages can be transmitted without having to modify paging terminal hardware or software or having to change its operating characteristics such as page length. The method for packetizing display programs of the present invention allows for the transmission of messages that are greater than one page in length without requiring a new paging format. Further, the packetizing method is useful in conjunction with the resorting operations used by existing paging companies.

Figure 4:
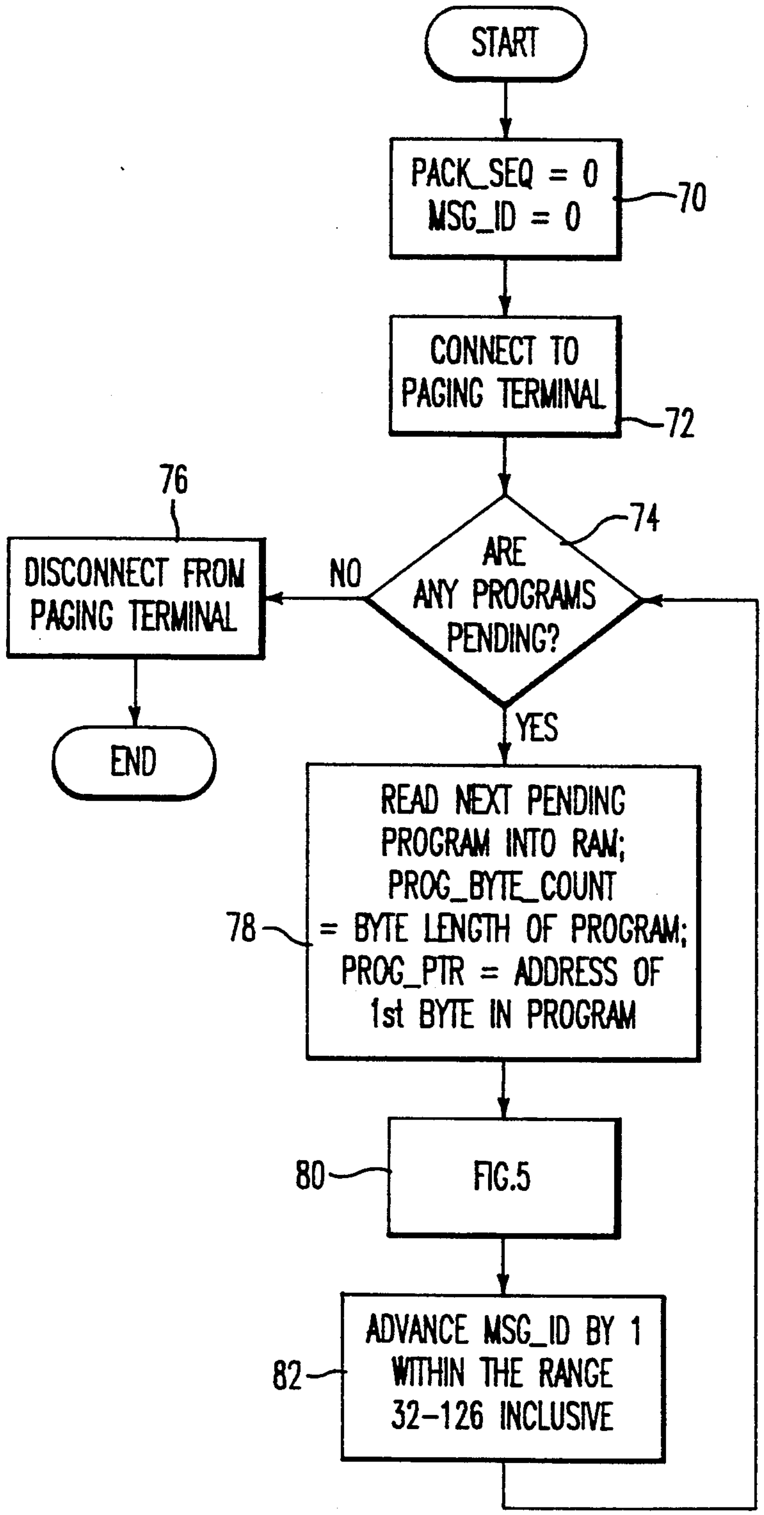
FIGS. 4, 5 and 6(*a*), 6(*b*), and 6(*c*) are flow charts depicting the sequence of operations for packetizing a display program into subpackets for transmission as one or more radiopages in accordance with the present invention.

In accordance with the system control program, after the computer 16 determines that display programs are scheduled for transmission, it performs an packetizing process described in connection with FIGS. 4, 5 and 6. FIG. 4 shows the outermost control loop of the transmission scheme in which the computer 16 establishes a connection to a paging terminal and, if a program is scheduled for transmission, undergoes the processes described in FIGS. 5 and 6 until the entire display program has been encoded into subpackets and transmitted as one or more pages to a designated paging terminal. As shown in block 70 of FIG. 4, the computer initializes variables PACK_SEQ and MSG_ID to zero values. PACK_SEQ is increased by one each time a page is transmitted in the message corresponding to the display program. MSG_ID is a number for identifying each message transmitted to an electronic sign and is incremented by one after each message or display program is transmitted. As shown in block 72, the computer 16 uses the serial port 52 and the telephone modem 20 to call and establish a data connection with a remote paging terminal 22 according to the initiation parameters associated with the ixo/TAP protocol.

After the connection and log-in sequence is established with the paging terminal, the computer 16 determines whether any display programs are pending for transmission, as indicated by the affirmative branch of decision block 74. If no programs are pending, the computer 16 disconnects from the paging terminal 22 and terminates the call as shown in block 76; otherwise, the computer 16 loads the next pending display program from the display program database 66 on the disk drive 18 into the RAM 42, as indicated by the affirmative branch of decision block 74 and block 78. The computer 16 subsequently initializes PROG_BYTE_COUNT to the total byte length of the display program, and uses a register PROG_PTR to point to the address of the first byte in the program stored in the RAM 42. The computer 16 transmits the program to the paging terminal in accordance with FIG. 5, as indicated in block 80. Once the entire program has been transmitted, the MSG_ID is incremented by one, as shown in block 82. MSG_ID is preferably restricted to binary values between 32 and 126 to void the possibility of a value less than 32 being misinterpreted as an ASCII control code and a value 127 being misinterpreted by the computer 16 as an ASCII symbol to delete a character. Thus, if MSG_ID advances past 126, it is reset to 32. The computer subsequently determines whether to check if any more display programs are pending.

Figure 5:
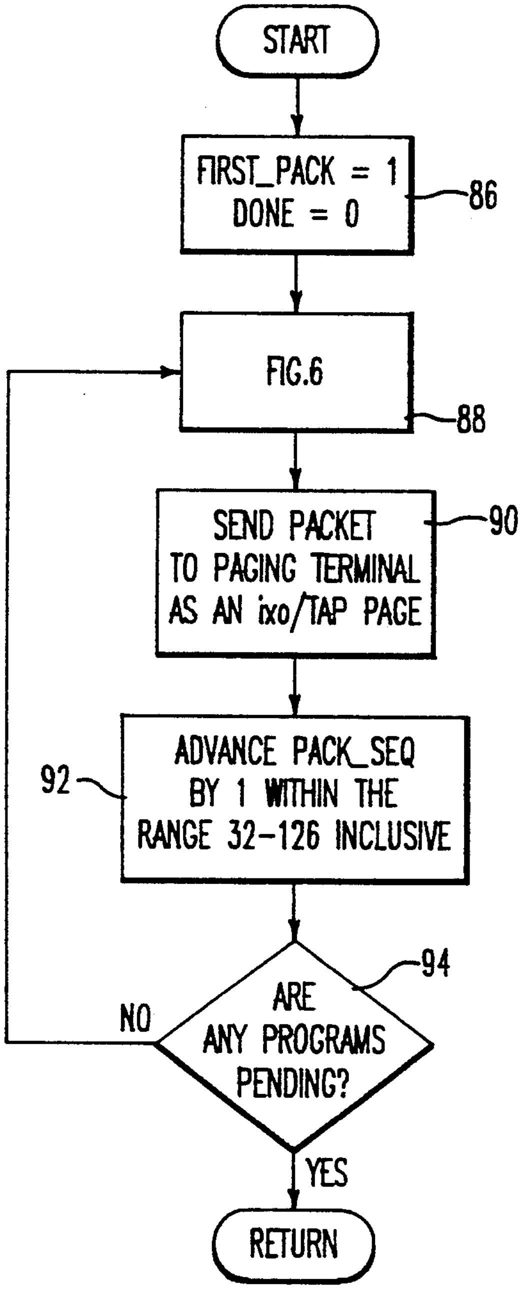

With reference to FIG. 5, the flow chart represents process control for transmitting a single display program to the paging terminal. As shown in block 86, the variable FIRST_PACK is set to one and the variable DONE is set to zero. The variable FIRST_PACK is used to insert a header packet at the beginning of each page. The variable DONE is used to indicate when a single page, also referred to as a packet, of the message or display program being transmitted has been created and sent to the paging terminal. A set of subpackets is subsequently generated starting with program data located at the RAM address referenced by PROG_PTR. As indicated in block 88, this operation is detailed in FIG. 6. After generation of a number of subpackets sufficient for transmission as a complete page, control advances to block 90 where the set of subpackets, each of which is preceded by a tilde character, is then transmitted by the computer 16 to the paging terminal 22 as a single page according to the ixo/TAP protocol. As shown in block 92, the variable PACK_SEQ is then incremented by one because a complete page has been transmitted. If PACK_SEQ advances past 126, then it is reset to 32 for the same reasons described above in connection with the variable MSG_ID. The variable DONE, which is initiated to 0 and then set to 1 in FIG. 6, is then tested by the computer 16. If DONE equals one, then the control loop for the computer returns block 88 for generation of the next set of subpackets, as shown in decision block 94.

Figure 6A:
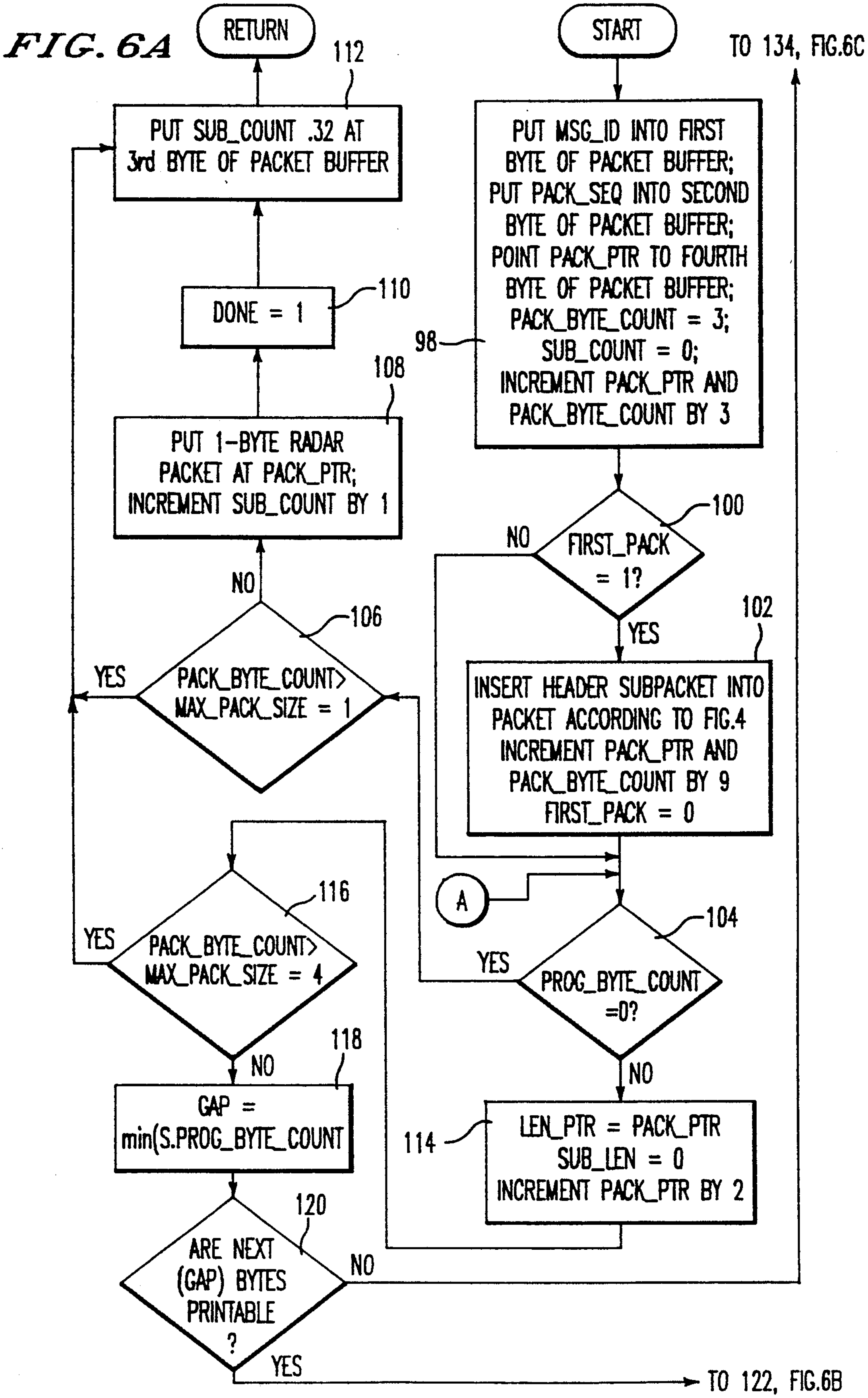
Figure 6B:
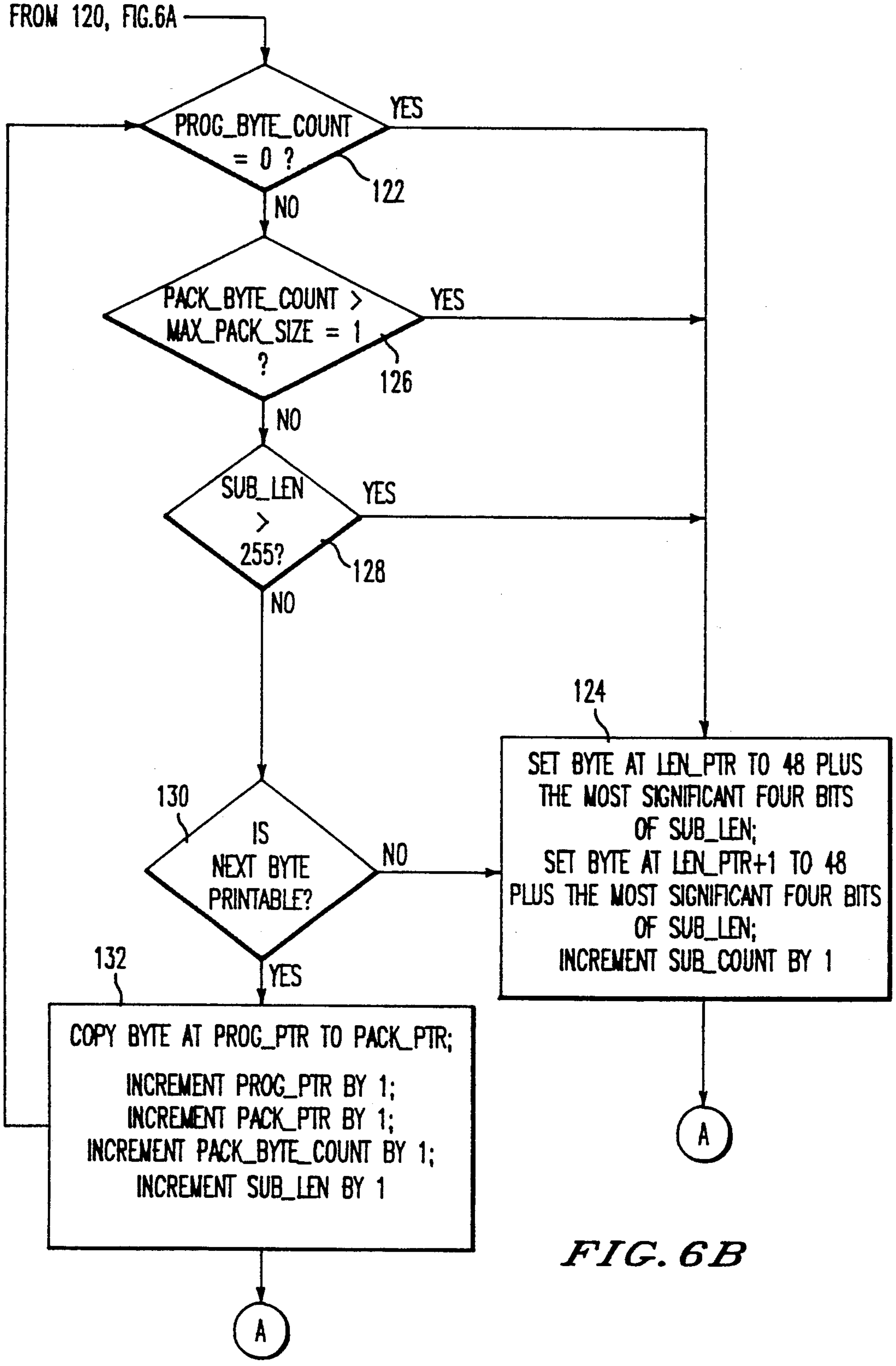
Figure 6C:
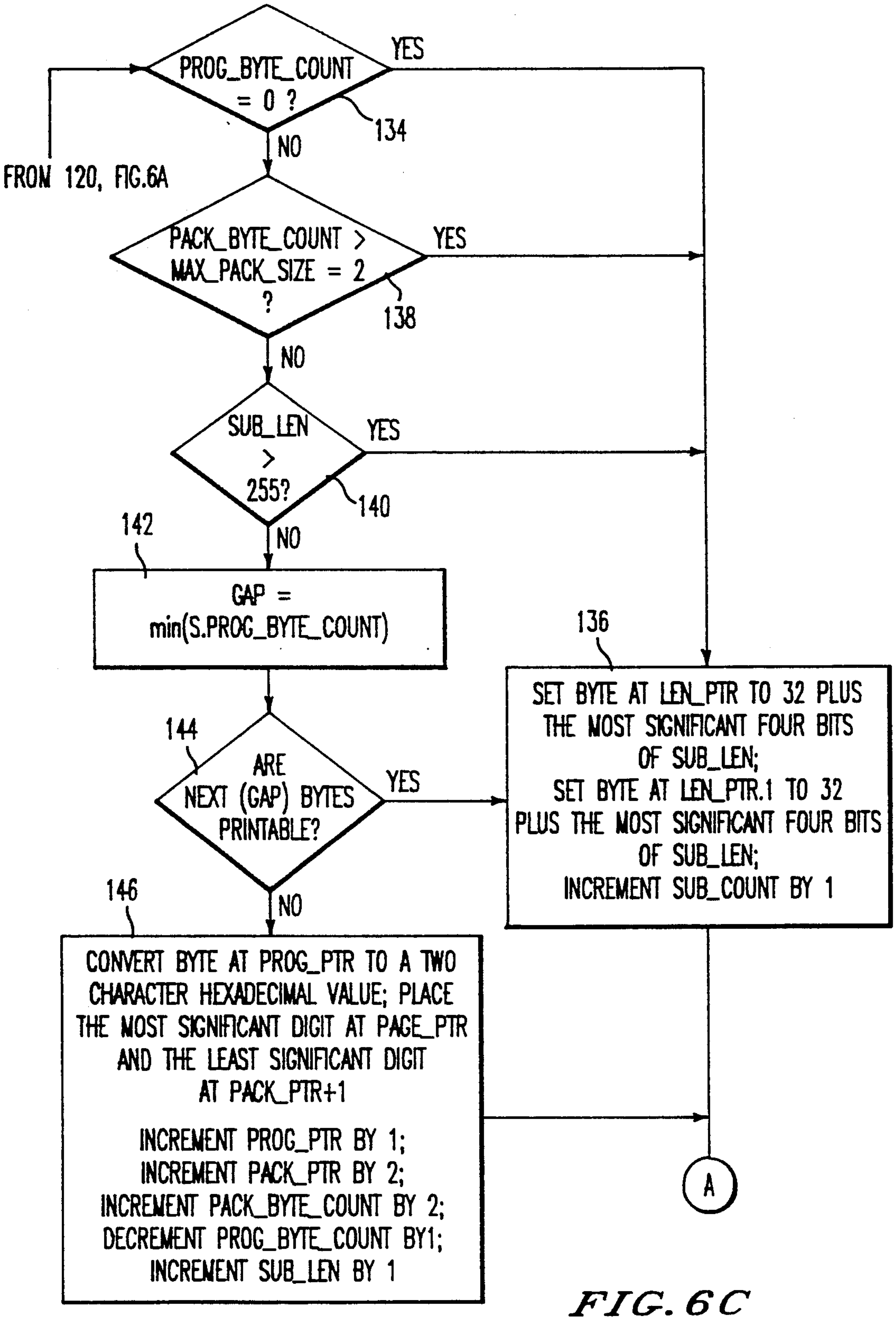

FIG. 6 details process control for the computer 16 to convert a block of data of an arbitrary length to a set of subpackets whose total length does not exceed the value MAX_PACK_SIZE. MAX_PACK_SIZE is a parameter set according to a paging equipment specification defining the maximum character length of a single page. With reference to block 98, the value of MSG_ID is stored in the first byte of a packet buffer in the RAM 42, and PACK_SEQ is stored in the second byte of the packet buffer. A pointer variable PACK_PTR is then pointed to the fourth byte of the packet buffer. The PACK_PTR variable is used by the computer 16 to indicate where the last header subpacket, display data subpacket or trailer subpacket (described below) is stored in the RAM 42. The third byte of the packet buffer contains the number of subpackets in the packet once the packet is completed. A variable PACK_BYTE_COUNT is then set to three, and a variable SUB_COUNT is set to zero. The variable PACK_BYTE_COUNT contains the running total length of the packet or page, and the variable SUB_COUNT contains the running total number of subpackets in the packet.

As indicated in decision block 100 of FIG. 6, the computer tests the variable FIRST_PACK. If this variable equals one, then the current packet is the first packet of the display program, and the computer 16 inserts a header subpacket into the packet at the RAM address specified by PACK_PTR. Since the header subpacket contains 13 bytes, the variables PACK_PTR and PACK_BYTE_COUNT are advanced by 13 and the variable FIRST_PACK is set to zero, as shown in block 102. The format of a header subpacket is as shown in Table 1:

TABLE 1

HEADER SUBPACKET FORMAT

| byte no. | byte type |
|---|---|
| byte 1 | 'H' |
| bytes 2-5 | hexadecimal representation of the group mask of the message. |
| bytes 6-9 | hexadecimal representation of the byte length of the display program. |
| bytes 10-13 | hexadecimal representation of the CRC16 checksum of the display program. |

The group mask of the message corresponds to a number assigned to each of a plurality of groups of electronic signs that receives display programs from a particular paging company in accordance with a further aspect of the present invention. For example, the group bits represent a 16 bit bit-mask for distinguishing between sixteen different groups of signs having the same capcode or RIC. Each sign is equipped with an EPROM (not shown) to store the group number. A display processor in the sign, which is described in further detail below in connection with FIG. 8, decodes packets whose header subpackets contain a group number corresponding to the number stored in the EPROM. The group numbers can therefore be used by a user to specify which ones of the groups of signs having the same RIC are to receive a particular display program.

With reference to block 104 in FIG. 6, the computer is programmed to examine the variable PROG_BYTE_COUNT to determine the number of display program bytes that remain to be transmitted. As will be discussed below, the PROG_BYTE_COUNT variable is decremented after each program byte is converted to at least one printable character. If no bytes remain (i.e., PROG_BYTE_COUNT equals zero), the computer 16 compares the variable PACK_BYTE_COUNT to the variable MAX_PACK_SIZE to determine if another byte can be added to the packet without violating the maximum page size defined by MAX_PACK_SIZE, as indicated by decision block 106. If PACK_BYTE_COUNT is greater in value than the variable MAX_PACK_SIZE minus one, then the packet has reached its maximum length. Accordingly, the computer writes the total number of subpackets to the third byte of the packet buffer, as shown in block 112; otherwise, the computer 16 appends a one byte trailer subpacket to the packet, as shown in block 118. The variable SUB_COUNT is then incremented by one, and the variable DONE is set to one. As shown in block 112, the variable SUB_COUNT is incremented by 32 and is placed in the third byte of the packet buffer. Computer control proceeds in accordance with block 90 of FIG. 5, whereby the completed packet is transmitted to a paging terminal. The variable SUB_COUNT is preferably restricted to values between 0 and 95. The value 32 is added to SUB_COUNT in order to make the third byte of the packet buffer a printable ASCII character between the values of 32 and 126 and therefore not likely to be misinterpreted by the computer as described above.

As indicated by the negative branch of decision block 104, the computer 16 sets the variable LEN_PTR to the same value as PACK_PTR, and sets the variable SUB_LEN to zero, as shown in block 114. Further, the variable PACK_PTR is incremented by two to allow for the insertion of two data subpacket starting bytes after each subpacket. As will be described below, program display characters are converted either to printable subpackets or to hexadecimal data subpackets. For either type of subpacket, the first two bytes of the subpacket identify the length and the type of packet. For example, the lower four bits of these two bytes can contain, respectively, the most significant and the least significant bits of the number of data elements in the subpacket. The upper four bits of these two bytes are "0010" for a hexadecimal data subpacket or "0011" for a printable data subpacket.

With further reference to block 114 in FIG. 6, display program characters are nonprintable and therefore are converted to hexadecimal data subpackets if they are not ASCII characters represented by binary values ranging between 32 and 126. These characters are instead converted to two character hexadecimal values. The variable SUB_LEN is used as a counter for the number of bytes in each of the subpackets of a page being generated in accordance with the program control depicted in FIG. 6. The variable LEN_PTR is used as a pointer to indicate the starting position of the current subpacket in memory where the first two bytes are set to indicate the length and type of subpacket after the subpacket is complete. The variable SUB_LEN is generally a value less then 256 so that it can be represented as an 8-bit binary number.

As shown in block 116 in FIG. 6, the computer 16 determines whether the variable PACK_BYTE_COUNT is greater than the variable MAX_PACK_SIZE minus four. MAX_PACK_SIZE is reduced by four bytes to reserve space within the packet for transmission of a tilde character (a character placed at the beginning of each page and by paging companies that contains a data and time stamp), the message identifier, the page serial number and the total number of packets. If the answer is in the affirmative, then the subpacket that is currently being generated may not fit within the page length specified by MAX_PACK_SIZE. The computer 16 therefore places the total number of subpackets into the third byte of the packet buffer, as shown by the affirmative branch of decision block 116 and block 112. The computer 16 otherwise sets the variable GAP to a value between 5 and the variable PROG_BYTE_COUNT, as shown in block 118.

The GAP variable is used by the computer to scan upcoming display program bytes in the RAM 42 to determine whether or not the next few bytes are printable (i.e., binary values between 32 and 126) characters or not. The GAP can be set at other values and is primarily used for more efficient processing of program bytes. For example, if the display program bytes in RAM 42 within the range specified by the GAP variable are printable, the computer proceeds to process the bytes as printable characters in accordance with the affirmative branch of decision block 120 and the control loop designated by blocks 122, 124, 126, 128, 130, and 132. If the following bytes are not printable, then the computer is programmed to perform a conversion process described below in connection with block 146. The conversion of nonprintable characters generally requires more processing than the printable characters. Thus, if the answer to the decision block 120 is in the affirmative, the display program bytes within the range established by the GAP variable are processed in accordance with the control loop designated by blocks 134, 136, 138, 140, 142, 144 and 146.

If the next GAP bytes in the display program fall within the range of 32 and 126 and, therefore, are in the printable ASCII character set allowed by the TAP/ixo protocol, the computer copies the bytes into a printable data subpacket. The top of the control loop for generating a printable data subpacket is block 122. As shown in block 122, the computer determines whether the variable PROG_BYTE_COUNT is zero and therefore indicates that the end of the display program has been reached. If the answer to the decision block 122 is in the affirmative, the computer encodes the variable SUB_LEN into two bytes at the beginning of the present subpacket to identify the type of subpacket and the length of the subpacket, as shown in block 124. With reference to block 124, the computer 16 sets two bytes at beginning of the current subpacket to indicate the type and the actual length of the subpacket. For example, the value at LEN_PTR is set to the most significant four bits of SUB_LEN plus 48 and the value at LEN_PTR+1 is set to the most significant four bits of SUB_LEN plus 48. The value 48 is added to SUB_LEN and LEN_PTR+1 in order to place "0011" in the upper four bits to signify that the packet is a printable data subpacket. The computer 16 also increments the variable SUB_COUNT by one before generating a trailer subpacket in accordance with programmed control beginning with the affirmative branch of decision block 104.

If the answer to the decision block 122 is in the negative, the computer 16 compares the variable PACK_BYTE_COUNT the variable MAX_PACK_SIZE, as indicated in decision block 126. If PACK_BYTE_COUNT is greater than MAX_PACK_SIZE minus one, then the packet has reached its maximum length and program control advances to block 124; otherwise, the computer examines SUB_LEN, as shown in decision block 128. If SUB_LEN is greater than 254, then it cannot be encoded into an eight bit binary value. Thus, if SUB_LEN is equal to 255, the computer operates in accordance with block 124. If SUB_LEN is less than 255, the computer determines whether the display program byte indicated at PROG_PTR in the RAM 42 is printable (i.e., a binary value within the range 32 and 126), as indicated by decision block 130. If the byte is not printable, then the printable data subpacket is terminated, as indicated by the negative branch of decision block 130, otherwise the byte is copied into the location addressed by PACK_PTR, as shown in block 132. In an alternate embodiment, the computer can use special encoding to place isolated non-printable characters within a printable data subpacket. The computer increments both PROG_PTR and PACK_PTR by one. Further, the computer 16 increases PACK_BYTE_COUNT by one, decrements PROG_BYTE_COUNT by one, and increases SUB_LEN by one before examining the variable PROGRAM_BYTE_COUNT in accordance with decision block 122.

If the answer to the decision block 120 is in the negative, the next subpacket generated is a hexadecimal data subpacket. The top of the loop which generates a hexadecimal data subpacket is block 134. As shown in block 134, the computer 16 examines the variable PROG_BYTE_COUNT to determine if it is zero (i.e., the end of the display program has been reached). If PROG_BYTE_COUNT is zero, the computer encodes the variable SUB_LEN into two bytes at the beginning of the present subpacket to identify the type of subpacket and the length of the subpacket, as shown in block 136. The computer 16 sets the value at LEN_PTR to the most significant four bits of SUB_LEN plus 32. The computer 16 also sets the value at LEN_PTR+1 to the most significant four bits of SUB_LEN plus 32. These variables are incremented by the binary equivalent of 32 in order to place "0010" in the upper four bits and thereby identify the subpacket as a hexadecimal data subpacket. The computer 16 then increments SUB_COUNT before appending a trailer subpacket to the subpacket, as indicated by the affirmative branch of block 104.

If the answer to the decision block 134 is in the negative, the computer 16 compares the variable PACK_BYTE_COUNT the variable MAX_PACK_SIZE, as indicated in decision block 138. If PACK_BYTE_COUNT is greater than MAX_PACK_SIZE minus two, then the packet has reached its maximum length and program control advances to block 136; otherwise, the computer examines SUB_LEN, as shown in decision block 140. In contrast with decision block 126, the comparison in decision block 138 takes into consideration the fact that nonprintable characters are converted into two hexadecimal data bytes. If SUB_LEN is greater than 255, then it cannot be encoded into an eight bit binary value. Thus, if SUB_LEN is equal to 255, the computer operates in accordance with block 136. If SUB_LEN is less than 255, the computer 16 sets the GAP variable to the minimum of a selected number (i.e., 5) and the variable PROG_BYTE_COUNT and determines whether the display program byte indicated at PROG_PTR in the RAM 42 is printable (i.e., a binary value within the range 32 and 126), as indicated by block 142 and decision block 144. If these bytes are all printable, then the hexadecimal data subpacket is terminated and the computer operates in accordance with block 136; otherwise the byte at PROG_PTR is converted to a character hexadecimal value, as shown in block 146.

With reference to block 146, the byte at PROG_PTR is converted into a two-digit hexadecimal number. The computer subsequently writes the most significant digit to the RAM address specified by PACK_PTR, and the least significant digit to the address specified by PACK_PTR+1. PROG_PTR is then incremented by one, and PACK_PTR is incremented by two. Further, PACK_BYTE_COUNT and SUB_LEN are incremented by one, and PROG_BYTE_COUNT is decremented by one. The computer subsequently continues to process the display program bytes stored in the RAM 42 in accordance with block 134.

Figure 7:
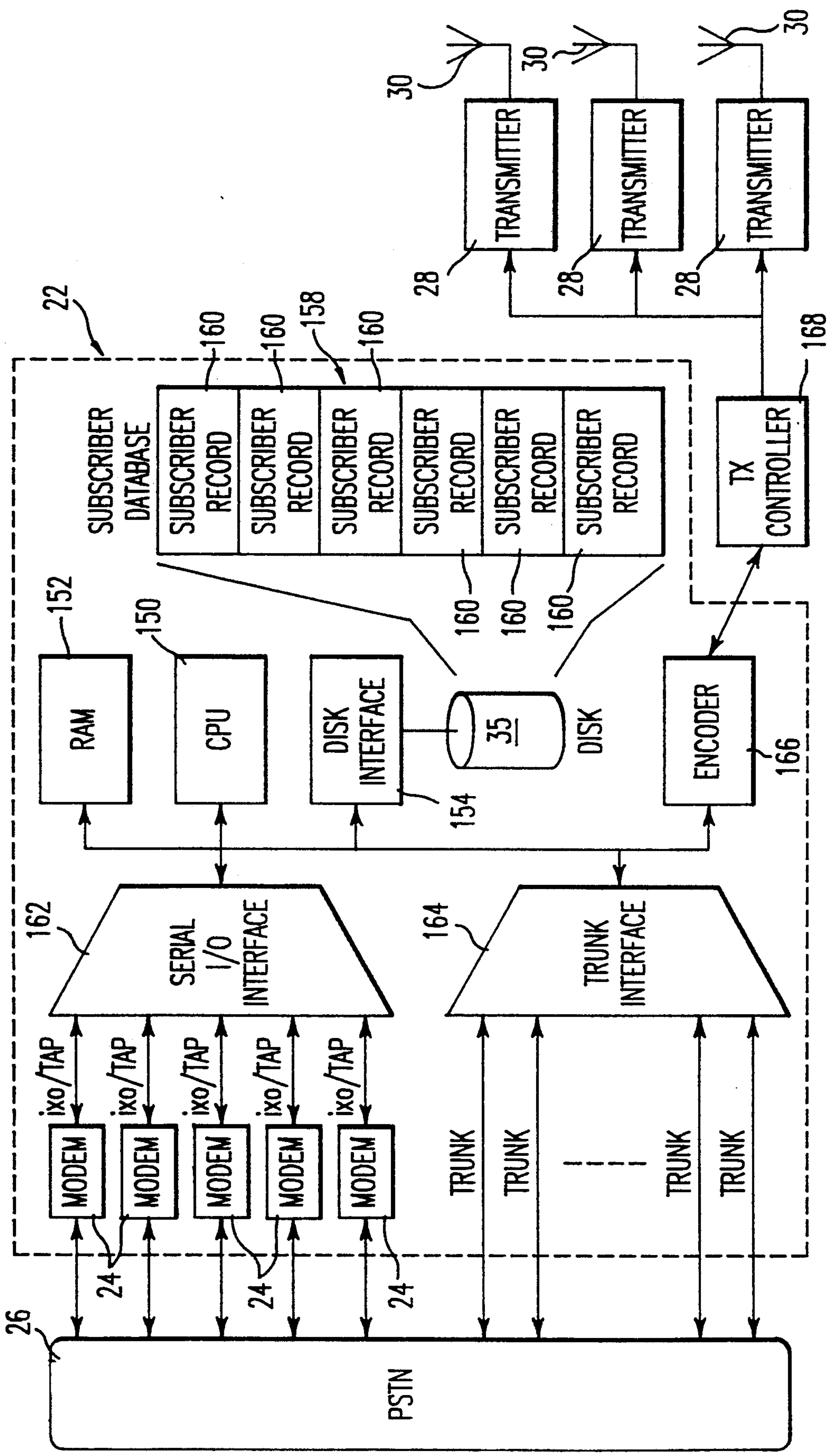
FIG. 7 is a schematic diagram of a paging terminal.

In accordance with the ixo/TAP protocol, each page transmitted to the paging terminal 22 comprises a first field corresponding to a pager identification number, which is also referred to as a pager ID or PIN, and a second field corresponding to a block of alphanumeric page data. A conventional paging terminal 22 is depicted in FIG. 7 for illustrative purposes. The paging terminal comprises a computer 150, a RAM 152 and a disk interface 154 for accessing data on a disk 156. The disk comprises a subscriber database 158 which in turn comprises a plurality of subscriber records 160. The subscriber record 160 is compatible with other records in the Subscriber Database 158 and comprises the receiver identity code (RIC), which uniquely identifies each paging receiver at the electronic signs, and the paging format.

The radiopaging code RPC.1 adopted by the Comitte Consultatif Internationale des Radiocommunications (CCIR), which is also known as POCSAG, is used by the paging terminal 22 in the preferred embodiment for sending signals to each subscribing paging terminal, although other digital formats are also suitable. The CCIR RPC.1 format is described in the book entitled Radiopaging Code No. 1, which has been compiled by the Radiopaging Code Standards Group (©RCSG, 23 Howland Street, London W1P6HQ), and which is incorporated herein by reference. Data is provided to the paging terminal 22 through a telephone MODEM 24 and a serial I/O interface 162 as ixo/TAP compatible blocks. In an alternate embodiment, the paging terminal 22 can use the Telocator Network Paging Protocol (TNPP), XMODEM or other paging compatible serial protocols developed for use with data transmitted via touch tone telephones to a trunk interface 164 in the paging terminal.

With further reference to FIG. 7, the CPU 150 transmits data received from the PSTN 26 and stored in the disk 156 to an encoder 166. The data is in the form of paging blocks generated in accordance with FIGS. 4, 5 and 6. The paging data is encoded into the CCIR RPC.1 format by the paging encoder 166, which uses one of a number of conventional encoding methods. The paging encoder 166 transmits the CCIR RPC.1 encoded paging blocks to a transmitter controller 168 which converts the data into frequency shift keyed format and then transmits the data to one or more transmitters 28. The transmitters shift the frequency of the FSK data to the carrier frequency indicated in the subscriber record 160, amplify the signal, and broadcast the information using an antenna 30.

Figure 8:
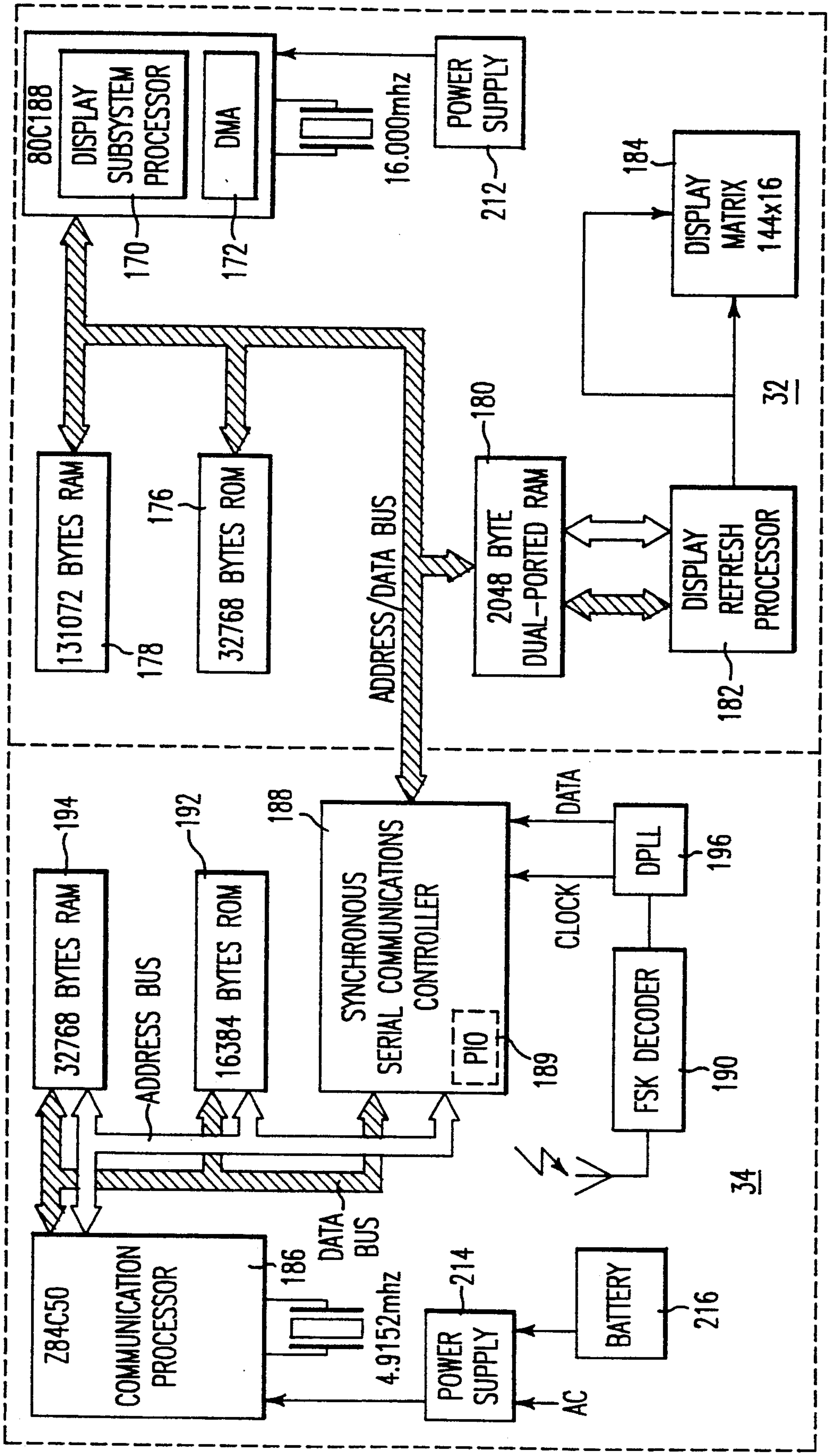
FIG. 8 is a schematic diagram of an electronic sign constructed in accordance with the present invention.

FIG. 8 illustrates the preferred embodiment of an electronic sign 32. As stated previously in connection with FIG. 1, the electronic sign 32 comprises a display subsystem 32 and a receiver subsystem 34. The display subsystem preferably comprises an 80C188 microprocessor 170 manufactured by Intel, Inc., and a DMA channel 172, which interfaces via a parallel I/O port with the communication subsystem 34, a 32 kilobyte read only memory (ROM) 176, a 130 kilobyte RAM 178, and a 1 kilobyte dual-ported RAM 180 that is shared between the display subsystem processor 170 and a display refresh processor 182. The display refresh processor 182, which is preferably a Z84C00 microprocessor manufactured by Zilog, Inc., interfaces with several output control lines to refresh a display matrix 184. The display matrix comprises 144 by 16 light emitting diodes for displaying a visual representation of display data stored in the dual-ported RAM 180. Alternate embodiments can employ a different processor architecture and a different display medium, such as flip dot displays, liquid crystal displays, or cathode ray tubes.

The communication subsystem 34 preferably comprises a Z84C50 microprocessor manufactured by Zilog, Inc., a universal synchronous serial controller 188 manufactured by Zilog Inc. (i.e., a Z84C90 integrated microprocessor peripheral which comprises a synchronous serial controller), an RF FSK receiver 190, a 16 kilobyte ROM 192, and a 32 kilobyte RAM 194. The synchronous serial communications controller 188 provides a parallel data port 189 between the communication processor 186 and the display processor 170. A digital phase locked loop (DPLL) 196 monitors the data from the FSK RF receiver 190, extracts a bit clock, and transmits the bit clock to the synchronous serial communications controller 188.

Figure 9:
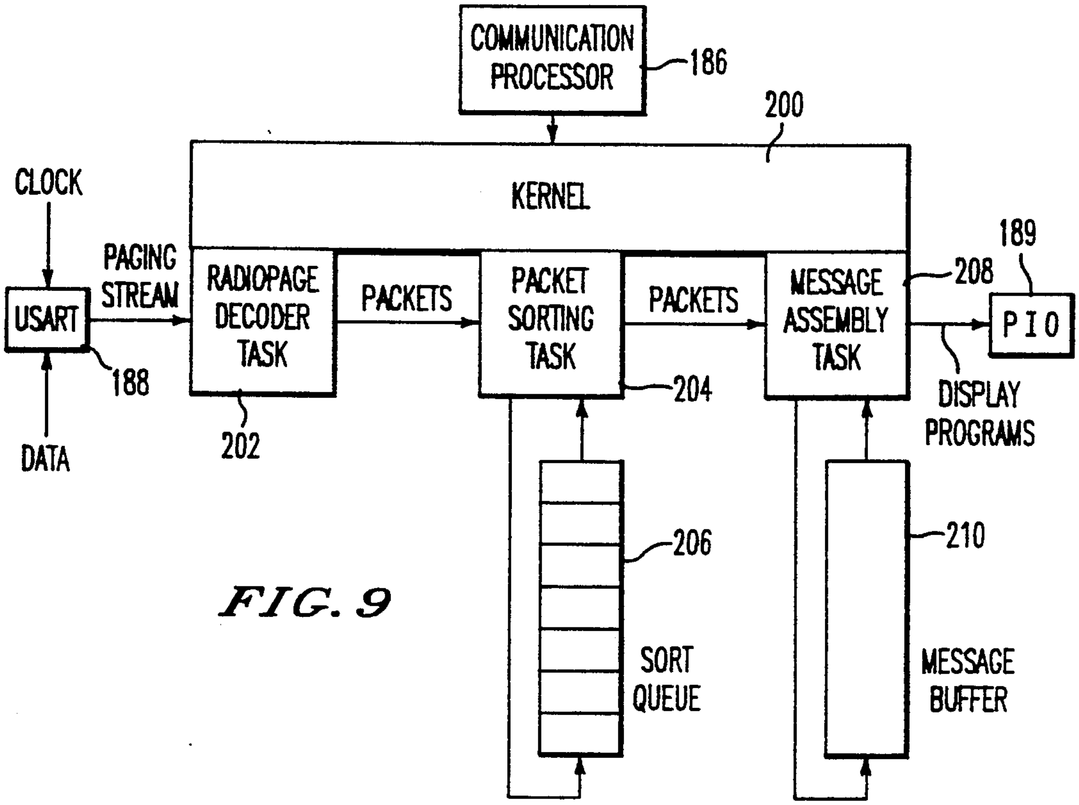
FIG. 9 is a schematic diagram of the communication subsystem software of an electronic sign.

FIG. 9 depicts the software organization within the ROM 192 of the communication subsystem 34. The communication processor 186 runs a multi-tasking kernel 200 which schedules a radiopage decoder task 202 according to data blocks received through the synchronous serial communications controller 188 from the RF FSK receiver 190. The operation of the radiopage decoder task 202 will be apparent to those trained in radiopaging art who are familiar with the CCIR RPC.1 paging format. This task 202 passes a decoded packet, which is extracted from each received page containing an RIC and a group mask matching those associated with the electronic sign, to a packet sorting task 204. The packet sorting task 204 maintains a queue of buffers 206 to store and sort each packet into its original order with respect to the other packets. These resorted packets are then passed to a message assembly task 208, which reconstructs the original display program in a message buffer 210. In accordance with the message assembly task, the communications processor transmits complete and error corrected display programs to the display subsystem 32 using the parallel I/O port 189.

Figure 10:
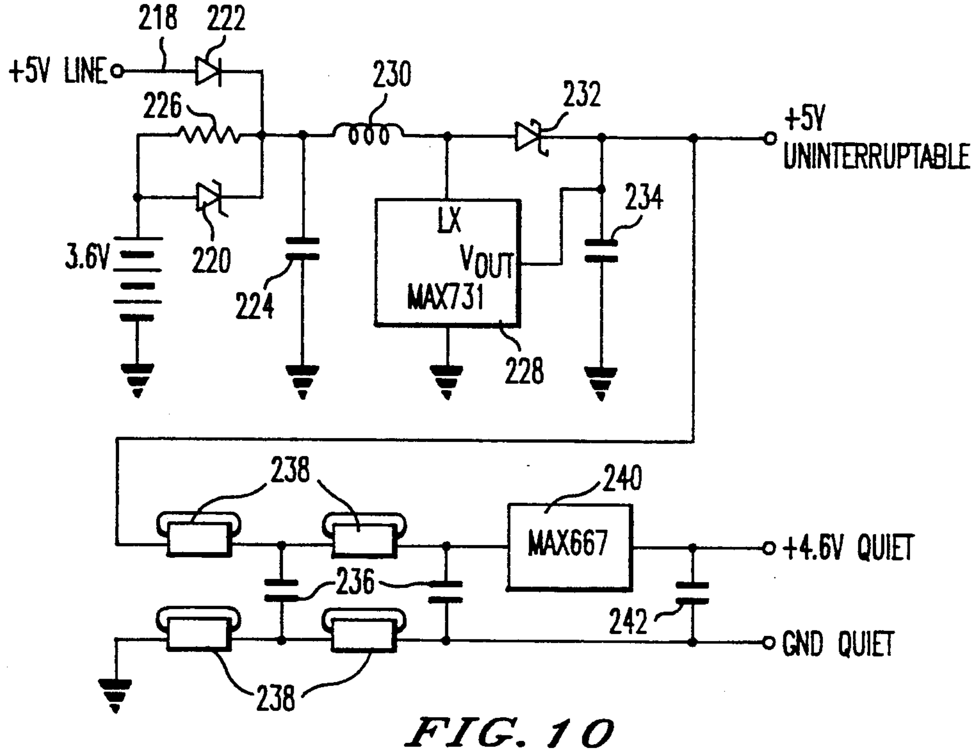
FIG. 10 is a schematic diagram of a communication subsystem power supply constructed in accordance with the present invention.

With further reference to FIG. 8, the electronic sign comprises a conventional power supply 212 for providing power to the display subsystem 32 and an intelligent power supply 214 for supplying power to the receiver subsystem 34. The intelligent power supply 214 employs a power supply architecture which operates the receiver subsystem 34 from a battery 216 when main line AC power is shut off. The circuit components of the intelligent power supply 214 are depicted in FIG. 10. As shown in FIG. 10, a +5 volt line 218 generated from an AC power input signal is ORed with a 3.6 volt nickel cadium (NiCd) battery pack 216 through a 1N5817 Schottky diode 220 and a 1N4001 silicon diode 222 to charge a 330 microfarad capacitor 224. In the presence of the +5 volt line voltage, a charging current flows through a resistor 226 to the NiCd battery 216, and the capacitor 224 charges to a maximum of 4.4 volts. In the absence of the +5 volt line voltage, the NiCd battery 216 charges the capacitor 224 to 3.3 volts.

With further reference to FIG. 10, the power supply 214 comprises an integrated circuit power controller 228, i.e., an MAX731 manufactured by Maxim Integrated Circuits, Inc., which is coupled to a 22 microhenries inductor 230, a 1N5817 switching diode 232, and a 330 microfarad capacitor 234 to form a boost regulator. This regulator configuration, which is known to those familiar with the power regulator art, converts a voltage signal between 2 and 4.7 volts across the load capacitor 234 to a 5 volt signal across the load capacitor 234 regulated through a wide range of load currents. The voltage across the load capacitor 234, therefore, remains an uninterruptible 5 volt signal regardless of the state of the line voltage.

In order to supply the receiver subsystem 34 with the quiet supply voltage it requires for battery operation, this uninterruptable +5 V power supply 214 is coupled, along with a signal ground, to a two stage ferrite filter composed of 15 picafarad high frequency capacitors 236 and ferrite beads 238. The output signals from this network are supplied to a low dropout linear regulator 240, i.e., a Maxim Integrated Circuits MAX667 regulator, which is trimmed according to Maxim literature to provide a 4.6 V output voltage across a 10 microfarad load capacitor 242. This 4.6 volt output signal, which is coupled to a quiet analog ground, is used to power the RF receiver subsystem 34. A quiet analog ground means that the power supply is filtered against high frequency switching transients generated by CMOS circuitry and lower frequency transients generated, for example, by the MAX731 power controller 228. These transients generate radio frequency energy within the receiver which adversely affects its sensitivity.

Figure 11A:
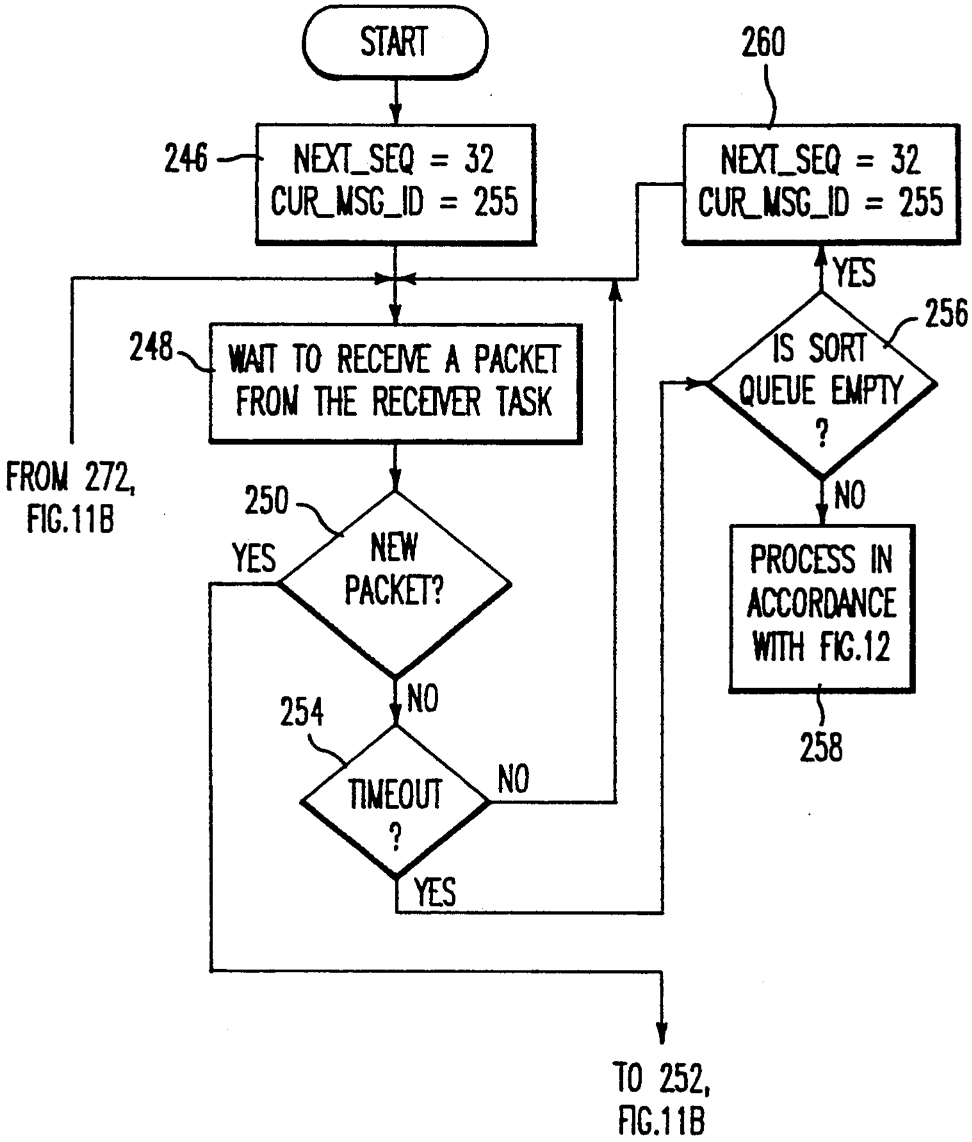
FIGS. 11(*a*), 11(*b*), 12(*a*) and 12(*b*) are flow charts depicting the sequence of operations for reconstructing a display program from multiple radiopages.
Figure 11B:
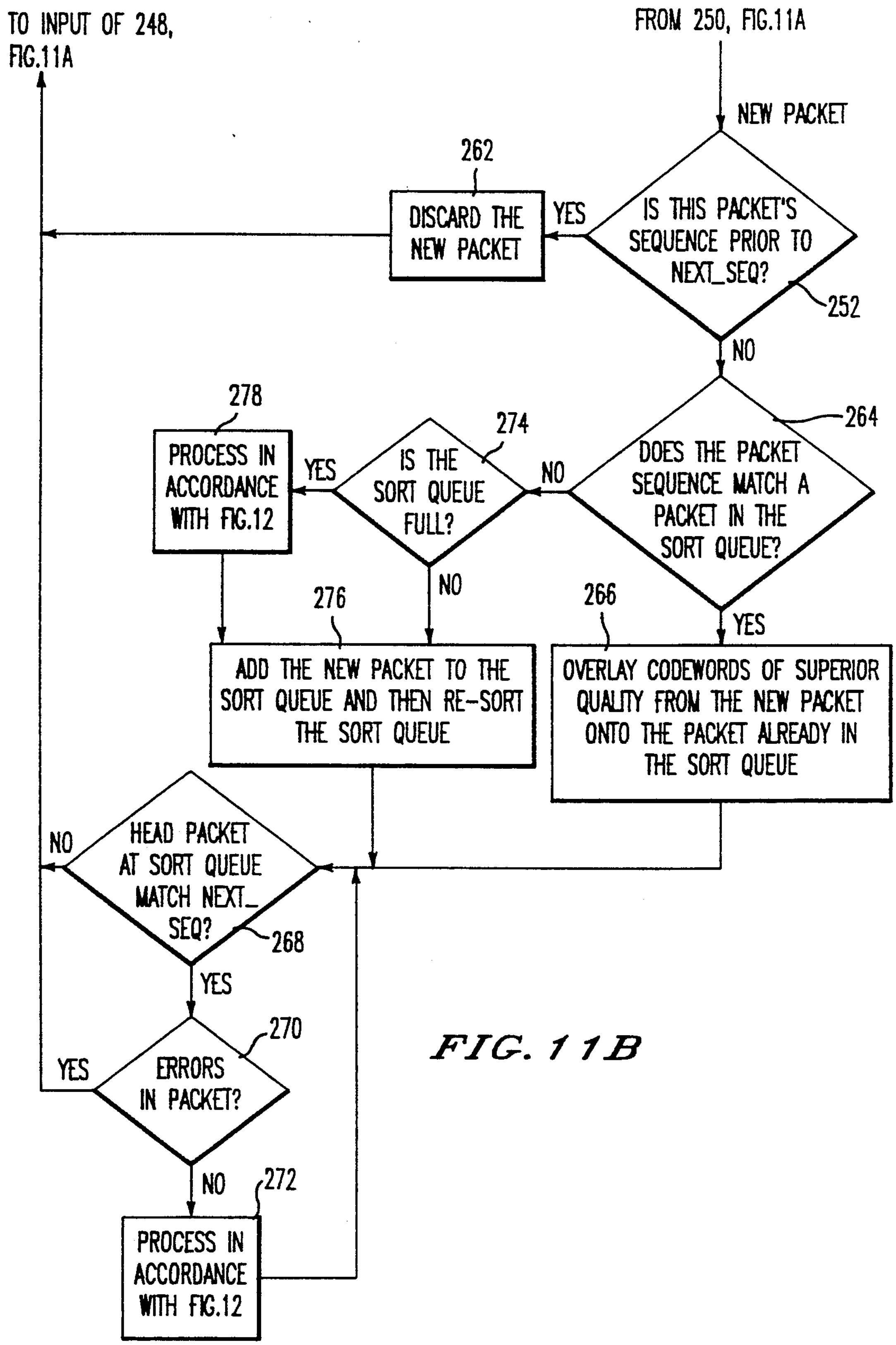
Figure 12A:
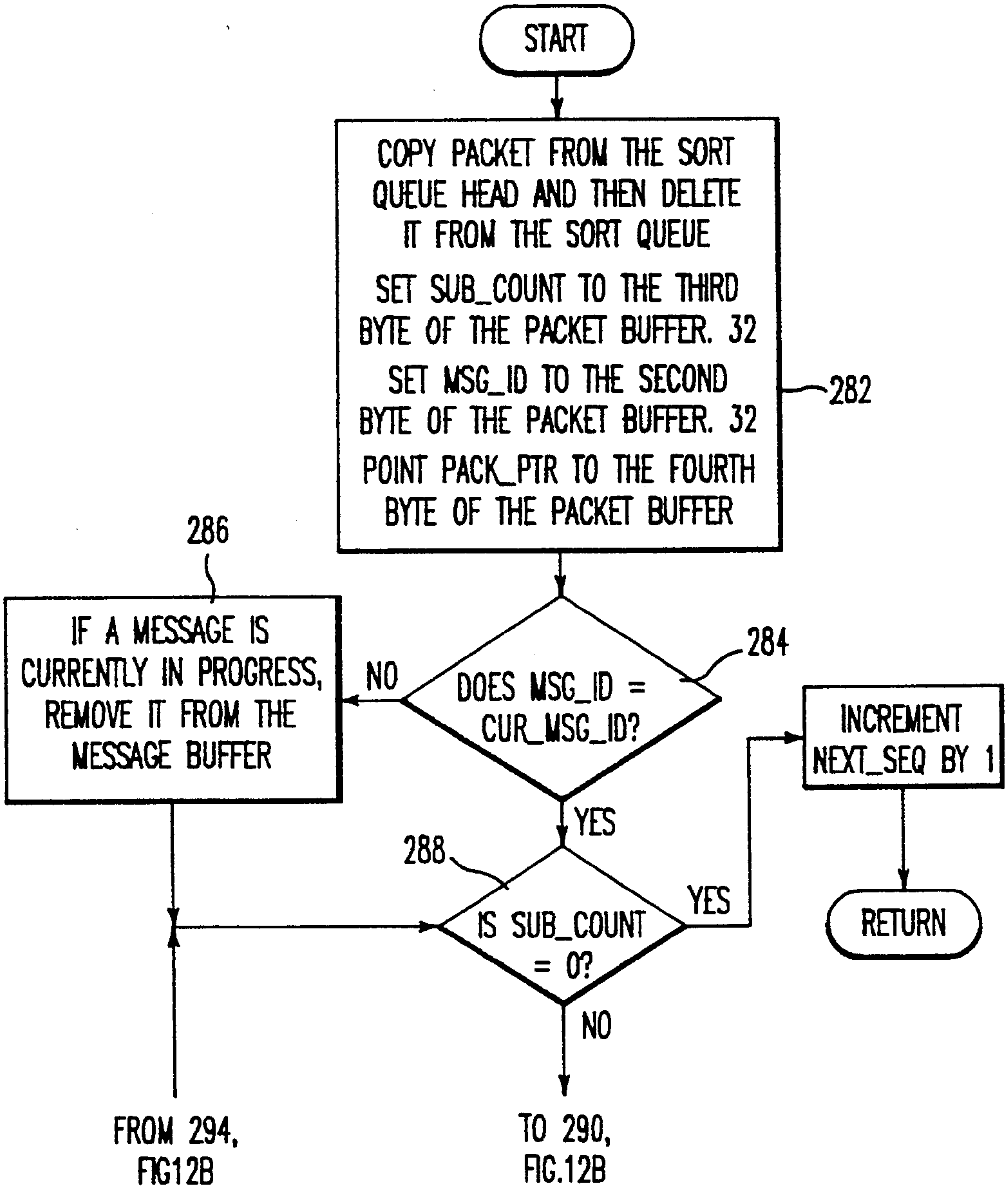
Figure 12B:
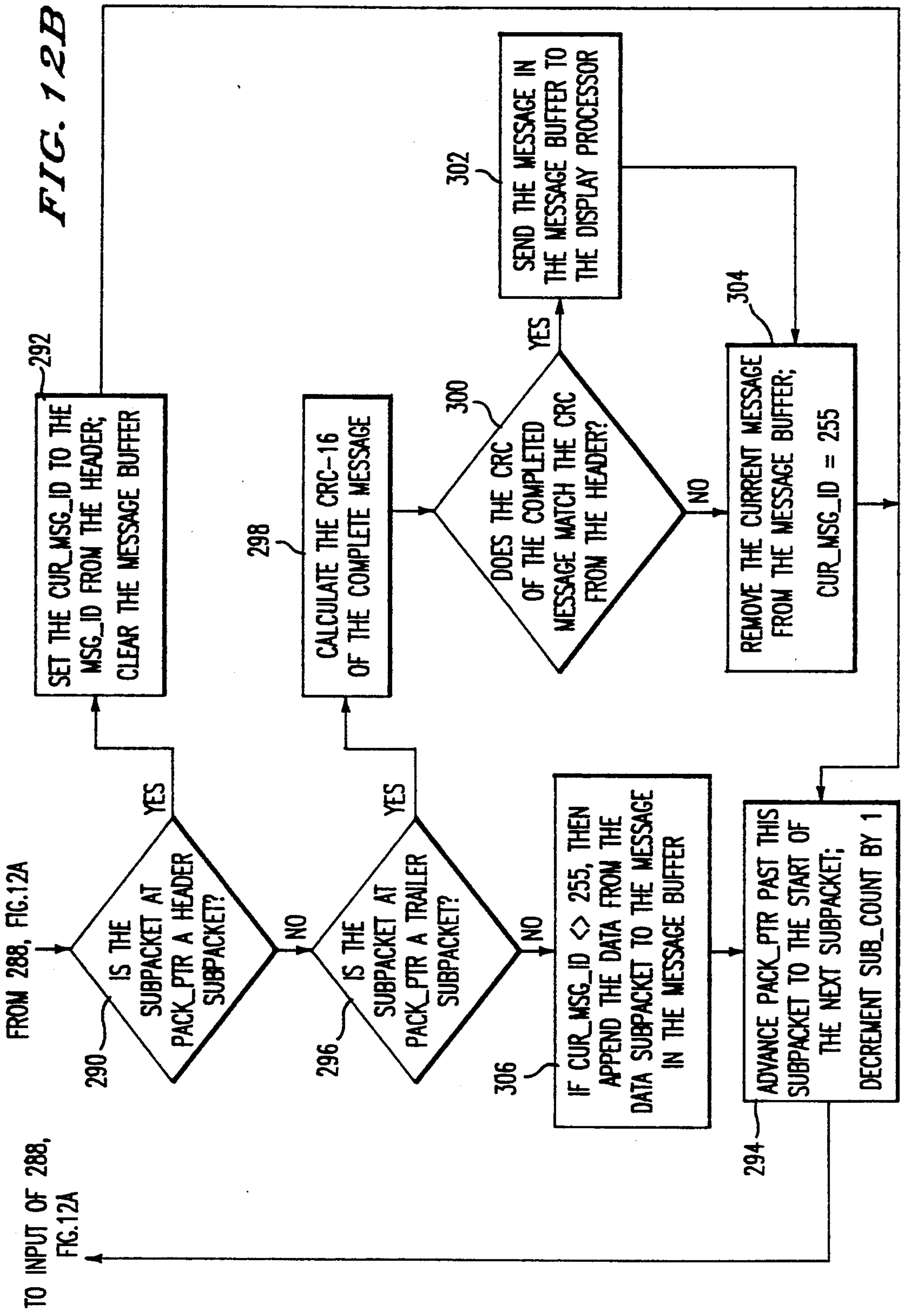

FIGS. 11 and 12 depict control programs corresponding to the packet sorting and message assembly tasks discussed in connection with FIG. 9. The communication processor 186 sets a variable NEXT_SEQ to the value 32, and the variable CUR_MSG_ID to the value 255, as shown in block 246. CUR_MSG is set to 255 to indicate that no message is currently being assembled. Since CUR_MSG will not increment past the value 126, the value 255 is specific to this purpose. NEXT_SEQ is set to 32 after a arbitrary period of time to indicate that the computer 16 has completed the process of sending data. The computer 16 sends data at a later time using a packet sequence 32 in order to guarantee a match with NEXT_SEQ. As indicated in block 248, the communications processor 186 subsequently suspends processing in accordance with the packet sorting task 204 until a packet is received and decoded in accordance with the radiopage decoder task 202, or a timeout signal is generated by the communication processor 186. The timeout signal is generated by the receiver task when no pages have been received for a specified period of time. As indicated by the affirmative branch of the decision block 250 and block 252, the communication processor 186 compares the sequence number of a new packet with NEXT_SEQ. If no new packet is received but a timeout signal is generated, the communication processor 186 begins to flush the sort queue 206, as indicated by the affirmative branch of decision block 254; otherwise, the communication processor continues to wait for receipt of a timeout signal or a new packet.

With reference to decision block 256 of FIG. 11, the communication processor 186 is programmed to flush the sort queue 206 if no pages are received during a predetermined, arbitrary timeout period. If any packets remain in the sort queue, the communication processor removes the packets from the sort queue and processes them, as shown in block 258, in chronological order and in accordance with FIG. 12, which is described below. If the sort queue is empty, the processor 186 sets the variable CUR_MSG_ID to the value 255 and the variable NEXT_SEQ to the value 32, as indicated by the affirmative branch of decision block 256 and block 260.

With further reference to block 252, the communication processor 186 compares the sequence byte of a new packet to NEXT_SEQ. If the sequence of the packet is prior to NEXT_SEQ, then the packet has already been accepted into the sort queue. As shown in block 262, the processor 186 discards the packet and proceeds to wait for a new packet or timeout signal. If the sequence number of the new packet is not prior to NEXT_SEQ, the processor 186 removes all characters in the new packet that precede the first tilde character and compares the new packet to the packets in the sort queue 206. As shown by the affirmative branch of decision block 264, if a packet with an identical sequence number is found in the sort queue, the communication processor 186 replaces damaged data in the packet found in the sort queue with corresponding corrected or undamaged data in the newly received packet. As shown in block 266, the processor 186 replaces damaged packet data by examining each byte in the queued packet and the error correction syndrome bits of the new packet carried forward from the radiopaging decoder task 202. If the syndrome bits in the byte of the new packet indicate that the byte did not require correction, or if the syndrome bits in the byte of the queued packet indicate that it was damaged beyond the capability of POCSAG error correction, then the byte in the queued packet is replaced with the byte in the new packet. Once this process is complete, the processor 186 examines the queue, as shown in block 268.

Blocks 268, 270 and 272 correspond to a process used by the processor 186 to determine whether the packet at the head of the sort queue is ready for processing. The communication processor compares the sequence of the head packet with the variable NEXT_SEQ. If these two values are not equal, then the packet at the head of the queue is not the next required packet. Accordingly, the communication processor proceeds to wait for a new packet or timeout signal from the receiver task. If these values match, the processor 186 determines if errors exist in the remaining bytes in the head packet, as indicated by the affirmative branch of decision block 268 and decision block 270. If uncorrected errors are found in the packet, the processor 186 proceeds to wait for a new packet or a timeout signal from the receiver task, as indicated by the negative branch of decision block 270. If the packet contains insubstantial errors, the processor 186 proceeds to process the packet in accordance with the program control depicted in FIG. 12, as shown in block 272.

The communication processor 186, in accordance with the receiver task 202, can process any number of repeated pages. The paging terminal 22, for example, can transmit each display program two times. Thus, if an error is found in a packet, the communication processor 186 can process a forthcoming duplicate packet with the radiopager decoder task and subsequently compare it with the corresponding packet in the sort queue as described in connection with block 266. If both transmissions of a page contain errors, the data will continue to be recovered as long as the same bytes in both transmissions are not damaged beyond the error correction capability of the CCIR RPC.1 protocol. If this is the case, the page contains an error. Accordingly, the communication processor 186 detects a variance with the CRC of the message and discards the message. Garbled data, therefore, does not appear on the targeted display. Error correction is disclosed in the above-referenced Radiopaging Code No. 1 and is known to those trained in the art of error correction codes. In some cases, repeated transmissions are not necessary and therefore waste broadcast time.

With further reference to decision block 264, if no match is found between the new packet and the sort queue, the processor 186 determines if the sort queue 206 is full, as indicated in decision block 274. If the queue is not full, the processor adds the new packet to the sort queue and then reorders the packets in sort queue in accordance with their sequence numbers, as shown in block 276. If the sort queue is full, the processor 186 removes the packet at the head of the sort queue in accordance with FIG. 12 to accommodate the new packet, as indicated in block 278. The new packet is subsequently added to the sort queue, and the packets in the sort queue are reordered, as indicated by block 276.

FIG. 12 depicts program control for processing a packet in the sort queue 206, transmitting the packets to the message assembly task 208, and extracting data from decoded data subpackets to rebuild the original display program. As shown in block 282, the processor 186 removes the packet from the sort queue and sets the variable SUB_COUNT to the third byte of the packet buffer minus 32. The value 32 was added to SUB_COUNT by the paging terminal in order to set SUB_COUNT to a value between 32 and 126, and is therefore being subtracted in block 282 to obtain the actual number of subpackets. The communication processor 186 also sets MSG_ID to the second byte of the packet buffer minus 32, and points PACK_PTR to the fourth byte of the packet buffer. The processor 186 subsequently compares MSG_ID with CUR_MSG_ID, as shown in decision block 284. If these two values are not the same, the processor 186 clears the message buffer, as indicated by block 286. If the two values are identical, the processor determines if the variable SUB_COUNT is zero, as shown in decision block 288. If SUB_COUNT is zero, the processor 186 increments NEXT_SEQ by 1, as shown in block 289, and control returns to the appropriate point in the process depicted in FIG. 11. The variable NEXT_SEQ is maintained at values between 32 and 126 to avoid confusion with ASCII control characters, as stated previously. If SUB_COUNT is a non-zero value, the communication processor examines the first subpacket determine whether or not it is a header subpacket, as shown in decision block 290. If the subpacket is a header subpacket, the processor 186 sets the variable CUR_MSG_ID to the same value as the variable MSG_ID, and resets the message buffer, as indicated in block 292. The processor 186 subsequently advances PACK_PTR to an address beyond the current subpacket and therefore to the start of the next subpacket, and decrements SUB_COUNT by one, as shown in block 294. The processor subsequently determines if SUB_COUNT is zero in accordance with decision block 288.

As indicated by the decision block 296 of FIG. 12, if the subpacket is not a header subpacket, the processor examines the subpacket to determine if it is a trailer subpacket. If this is the case, the processor calculates the CRC16 of the display program in the message buffer and compares it with the CRC16 recorded from the last header subpacket, as shown in block 298 and decision block 300. If the CRC values are the same, the contents of the message buffer is considered a valid display program. Accordingly, the processor 186 transfers the contents of the message buffer to the display subsystem 32, as shown in block 302. The processor 186 subsequently resets the message buffer, and sets CUR_MSG_ID to the value 255, as indicated in block 304. With further reference to block 300, the receiver also resets the message buffer and sets CUR_MSG_ID to 255 if the CRC values do not match. If the answer to the decision block 296 is in the negative, the communication processor appends the data from the data subpacket to the message in the message buffer 210 since CUR_MSG_ID is not equal to 255, as shown in block 306. The communication processor subsequently rebuilds the original display program from the decoded data subpackets in the message buffer and transmits the programs to the display processor using the PIO 189.

In accordance with the present invention, the communication processor 186 can collect redundant packets and compare them codeword by codeword in order to maintain packet accumulators containing the least erroneous and therefore the most superior quality codewords. The intelligent power supply coupled to the communication processor 186 allows the reception and storage of messages that are transmitted when the electronic sign is turned off. Further, processing of display messages by the system control computer 16 allows for the storage of display messages and their transmission as pages during under-utilized off-peak periods for paging channels, thereby providing paging companies the opportunity to offer expanded data transmission services.

Although the present invention has been described with reference to a preferred embodiment, the invention is not limited to the details thereof. Various modifications and substitutions will occur to those of ordinary skill in the art, and all such modifications and substitutions are intended to fall within the spirit and scope of the invention as defined in the appended claims.

What is claimed is:

1. A method for formatting display programs as radiopaging signals to control electronic signs, comprising the steps of:

writing said display programs to digital memory;

creating a packet buffer in said digital memory;

generating a first data byte comprising a message identification number uniquely identifying at least one of said display programs and storing said message identification number in said packet buffer;

generating a second data byte comprising a packet sequence number uniquely identifying each of said packets created to transmit said display program to at least one electronic sign and storing said packet sequence number in said packet buffer;

reading a predetermined number of bytes of said display program into said packet buffer, said predetermined number corresponding to the maximum number of bytes permitted per page in accordance with a selected radio paging format;

examining said display program stored in said digital memory to determine whether additional bytes of said display program remain;

transmitting the contents of said packet buffer to a paging terminal;

reading said predetermined number of said remaining bytes into said packet buffer; and incrementing said packet sequence number by one.

2. A method as claimed in claim 1, wherein said writing step comprises the steps of determining the number of bytes contained in at least one of said display programs to be transmitted to at least a selected one of said signs, and setting first and second variables in said memory equal to said number of bytes and to a beginning memory address for storage of said program, respectively.

3. A method as claimed in claim 1, wherein each of said reading steps comprises the step of converting characters in said display programs to printable subpackets and hexadecimal data subpackets, said printable subpackets comprising display program characters corresponding to ASCII characters having binary values between 32 and 126, said hexadecimal data subpackets comprising two-digit hexadecimal values representing ASCII characters having binary values less than 32 and ASCII characters having binary values greater than 126.

4. A method as claimed in claim 3, wherein each of said reading steps further comprises the steps of generating bytes to distinguish said printable subpackets from said hexadecimal data subpackets, and appending said bytes to corresponding ones of said subpackets.

5. A method as claimed in claim 4, wherein each of said reading steps further comprises the steps of generating bytes indicating the length of each subpacket, and appending said bytes to corresponding ones of said subpackets.

6. A method as claimed in claim 3, wherein each of said reading steps comprises the step of appending header and trailer subpackets to said printable and hexadecimal data packets.

7. A method as claimed in claim 1, wherein each of said reading steps comprises the steps of dividing said predetermined number of bytes into a number of subpackets composed of a specified number of bytes, incrementing a subpacket length counter by one for each of said bytes read into said packet buffer, and resetting said subpacket length counter when said specified number of packets has been read into said packet buffer.

8. A method as claimed in claim 1, wherein said transmitting step comprises the step of transmitting said packet buffer contents as an ixo/TAP formatted page to said paging terminal.

9. A method as claimed in claim 1, further comprising the step of incrementing said message identification number by one when said display program has been read from said packet buffer and transmitted in its entirety to said paging terminal.

10. A method for processing radiopaging signals at a paging receiver to retrieve packetized data messages transmitted to said receiver by a paging terminal, comprising the steps of:

receiving a first packet from said paging terminal and processing said first packet for storage in a sort queue configured to store a plurality of packets;

receiving a second packet from said paging terminal;

setting a variable NEXT—SEQ to a predetermined value to indicate that no new packets have been received during a specified time period;

determining whether a packet sequence number provided in said second packet is less than said NEXT—SEQ, and discarding said second packet when said packet sequence number is less than said NEXT SEQ;

comparing said second packet with said first packet stored in said sort queue to determine if said second packet matches said stored packet;

writing said second packet into said sort queue if said second packet is different from said previously stored packet; and sorting said first and second packets stored in said sort queue in accordance with packet sequence numbers associated with each of said stored packets.

11. A method as claimed in claim 10, wherein said comparing step comprises the step of substituting at least one code word provided in said second packet for a corresponding code word in said first packet when said packet sequence number of said second packet matches the packet sequence number of said first packet and said second packet code word is of superior quality to said first packet code word.

12. A method as claimed in claim 10, wherein said writing step comprises the step of processing said stored packets in said sort queue to reconstruct said date messages when said sort queue is substantially full.

13. A method as claimed in claim 10, further comprising the step of processing at least one of said stored packets in said sort queue for transmission to a display processor coupled to said paging receiver when said packet sequence number of said packet matches the value of NEXT_SEQ.

14. A method as claimed in claim 13, wherein said processing step further comprises the steps of:

obtaining from a header subpacket transmitted with said packet the number of subpackets provided in said packet and a message identification number identifying which of a plurality of messages transmitted using said radiopaging signals comprises said packet;

setting a variable SUB_COUNT to a value corresponding to said number of subpackets;

appending data subpackets following said header subpacket in said packet to a message buffer configured for storing said message data after depacketization;

examining said data subpackets for errors after detection of a trailer subpacket and generating error data;

comparing error data provided in said header subpacket with said generated error data;

decrementing SUB_COUNT by one after each subpacket is processed; and incrementing NEXT_SEQ by one when SUB_COUNT is zero.

15. A method as claimed in claim 10, wherein at least one of said data messages comprises a plurality of pages transmitted to said paging terminal in accordance with the ixo/TAP protocol, the length of each of said pages being specified by said paging terminal.

16. A system for providing data messages to a paging terminal for transmission to an electronic sign comprising:

a digital memory for storing display programs used for generating data messages comprising alphanumeric characters and animated graphics on said electronic sign;

a processor for packetizing at least one of said display programs to generate a radiopage comprising a pager identification number and a data block of display program packets;

a modem coupled to said processor and to at least one telephone line, said processor being operable to provide said radiopage to said modem; and a paging terminal coupled to said telephone line for receiving and processing said radiopage transmitted by said modem, said paging terminal comprising a database of subscriber records for converting said pager identification number (PIN) to a receiver identification code (RIC) corresponding to said sign, said paging terminal being operable to broadcast said radiopage to said sign.

17. A system as claimed in claim 16, wherein said digital memory is configured to store number and line discipline parameters for establishing a call to said paging terminal, data to convert a PIN to an RIC for each of a plurality of sign groups, and a group mask bit to differentiate signs in the same group and having the same RIC.

18. A system as claimed in claim 16, wherein said processor processes said display program to create a packet having a header subpacket, a trailer subpacket and a number of data subpackets, said number of data subpackets being substantially equal to the number of subpackets necessary to create one full page, the length of said full page being determined by the paging terminal.

19. A system as claimed in claim 18, wherein said processor is operable to send a display program comprising a plurality of pages by placing in said data subpackets a message identification number to distinguish said display program from other display programs, a packet sequence number identifying each of said pages of said display program, and a number corresponding to the number of said data subpackets inserted between said header and trailer subpackets.

20. A system as claimed in claim 19, wherein said processor is operable to send said pages to said paging terminal as ixo/TAP formatted pages.

21. A system as claimed in claim 19, further comprising a receiver processor coupled to said sign for depacketizing said display program in accordance with said message identification number, said packet sequence number and said subpacket number.

22. A system as claimed in claim 16, wherein said processor is operable to transmit 7-bit ASCII characters and to convert 8-bit data words into two-character hexadecimal values.

23. A system as claimed in claim 16, wherein said sign comprises a receiver processor for decoding said radiopage into said packets of said display program, and a display processor for using said display packets to generate animated graphics on said sign.

24. A system as claimed in claim 23, wherein said receiver processor is operable to sort said packets into the order in which said packets were generated by said processor, and to replace damaged ones of said packets with packets that were transmitted during a repeat transmission of said display program and having fewer errors.

* * * * *